(12) United States Patent
Hawkins et al.

(10) Patent No.: US 10,733,436 B2
(45) Date of Patent: Aug. 4, 2020

(54) LOCATION PROCESSOR FOR INFERENCING AND LEARNING BASED ON SENSORIMOTOR INPUT DATA

(71) Applicant: Numenta, Inc., Redwood City, CA (US)

(72) Inventors: Jeffrey C. Hawkins, Atherton, CA (US); Marcus Anthony Lewis, San Francisco, CA (US)

(73) Assignee: Numenta, Inc., Redwood City, CA (US)

( * ) Notice: Subject to any disclaimer, the term of this patent is extended or adjusted under 35 U.S.C. 154(b) by 85 days.

(21) Appl. No.: 15/934,795

(22) Filed: Mar. 23, 2018

(65) Prior Publication Data

US 2018/0276464 A1    Sep. 27, 2018

Related U.S. Application Data

(60) Provisional application No. 62/476,409, filed on Mar. 24, 2017, provisional application No. 62/569,379, filed on Oct. 6, 2017.

(51) Int. Cl.
*G06K 9/00* (2006.01)
*G06K 9/62* (2006.01)
(Continued)

(52) U.S. Cl.
CPC ..... *G06K 9/00577* (2013.01); *G06K 9/00979* (2013.01); *G06K 9/3241* (2013.01);
(Continued)

(58) Field of Classification Search
None
See application file for complete search history.

(56) References Cited

U.S. PATENT DOCUMENTS 9,098,741 B1    8/2015  Anguelov et al.
2014/0333775 A1* 11/2014  Naikal .................. H04N 7/181
                                                           348/159

(Continued)

OTHER PUBLICATIONS

PCT International Search Report and Written Opinion, PCT Application No. PCT/US18/24148, dated Jun. 6, 2018, 19 pages.

*Primary Examiner* — Samira Monshi
(74) *Attorney, Agent, or Firm* — Fenwick & West LLP

(57) ABSTRACT

An inference system performs inference, such as object recognition, based on sensory inputs generated by sensors and control information associated with the sensory inputs. The sensory inputs describe one or more features of the objects. The control information describes movement of the sensors or known locations of the sensors relative to a reference point. For a particular object, an inference system learns a set of object-location representations of the object. An object-location representation is a unique characterization of an object-centric location relative to the particular object. The inference system also learns a set of feature-location representations associated with the object-location representation that indicate presence of features at the corresponding object-location pair. The inference system can perform inference on an unknown object by identifying candidate object-location representations consistent with feature-location representations observed from the sensory input data and control information.

24 Claims, 28 Drawing Sheets

(51) Int. Cl.
  *G06N 5/04* (2006.01)
  *G06N 3/08* (2006.01)
  *G06N 3/04* (2006.01)
  *G06K 9/46* (2006.01)
  *G06K 9/32* (2006.01)

(52) U.S. Cl.
  CPC ......... *G06K 9/4623* (2013.01); *G06K 9/4628* (2013.01); *G06K 9/6215* (2013.01); *G06N 3/0454* (2013.01); *G06N 3/08* (2013.01); *G06N 5/04* (2013.01)

(56) References Cited

U.S. PATENT DOCUMENTS

2016/0092736 A1  3/2016  Mai et al.
2016/0217164 A1  7/2016  Hawkins et al.

\* cited by examiner

Wedge Object

Object-Location Representation

| Location | Feature | Module 1 | Module 2 |
|---|---|---|---|
| $f_1$ |  Feature C Acute Corner |  388 |  390 |
| $f_3$ |  Feature A 90° Corner |  392 |  394 |

. . .

---

Cube Object

Object-Location Representation

| Location | Feature | Module 1 | Module 2 |
|---|---|---|---|
| $f_1$ | Feature A 90° Corner |  380 | 382 |
| $f_3$ | Feature A 90° Corner |  384 | 386 |

. . .

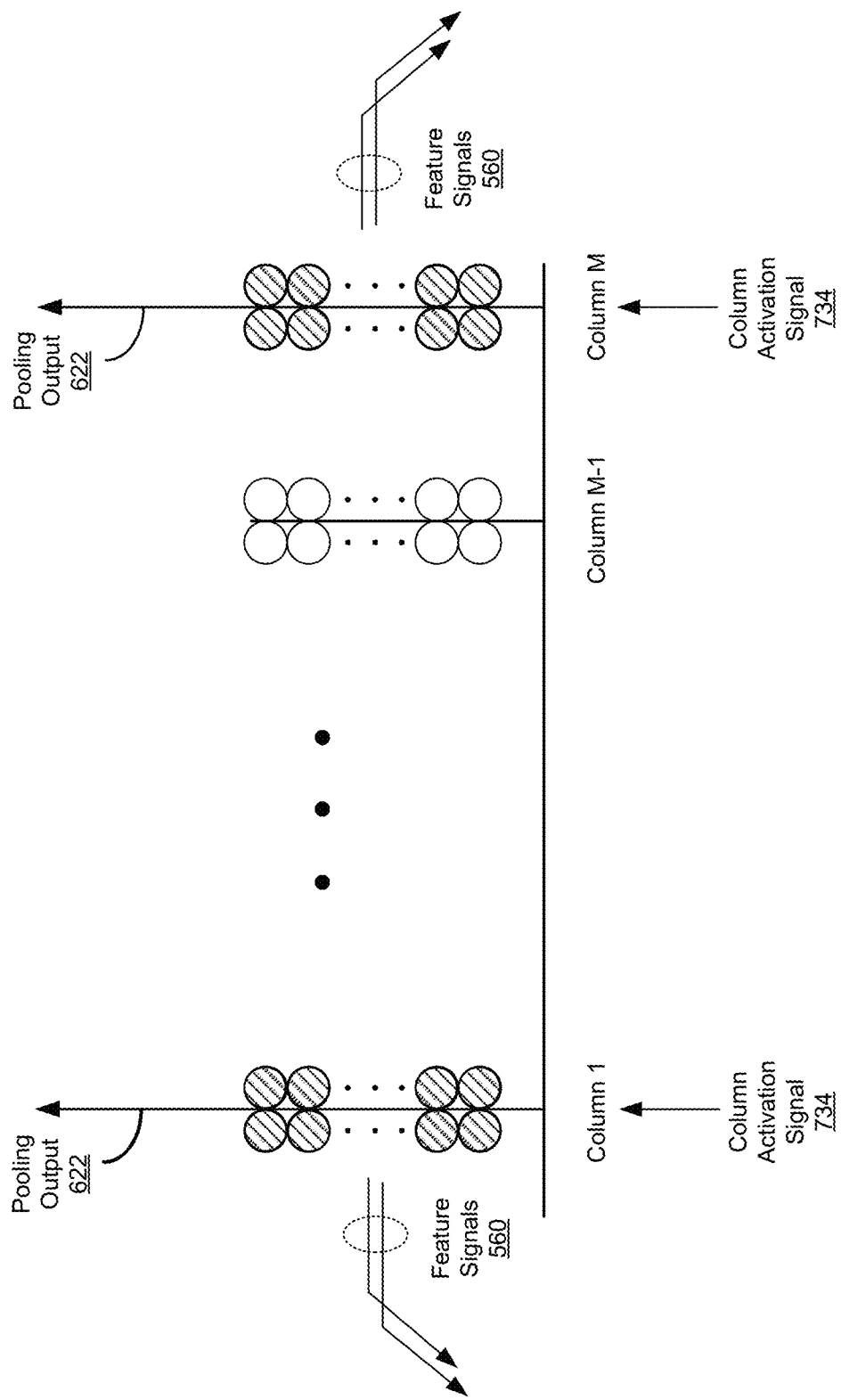

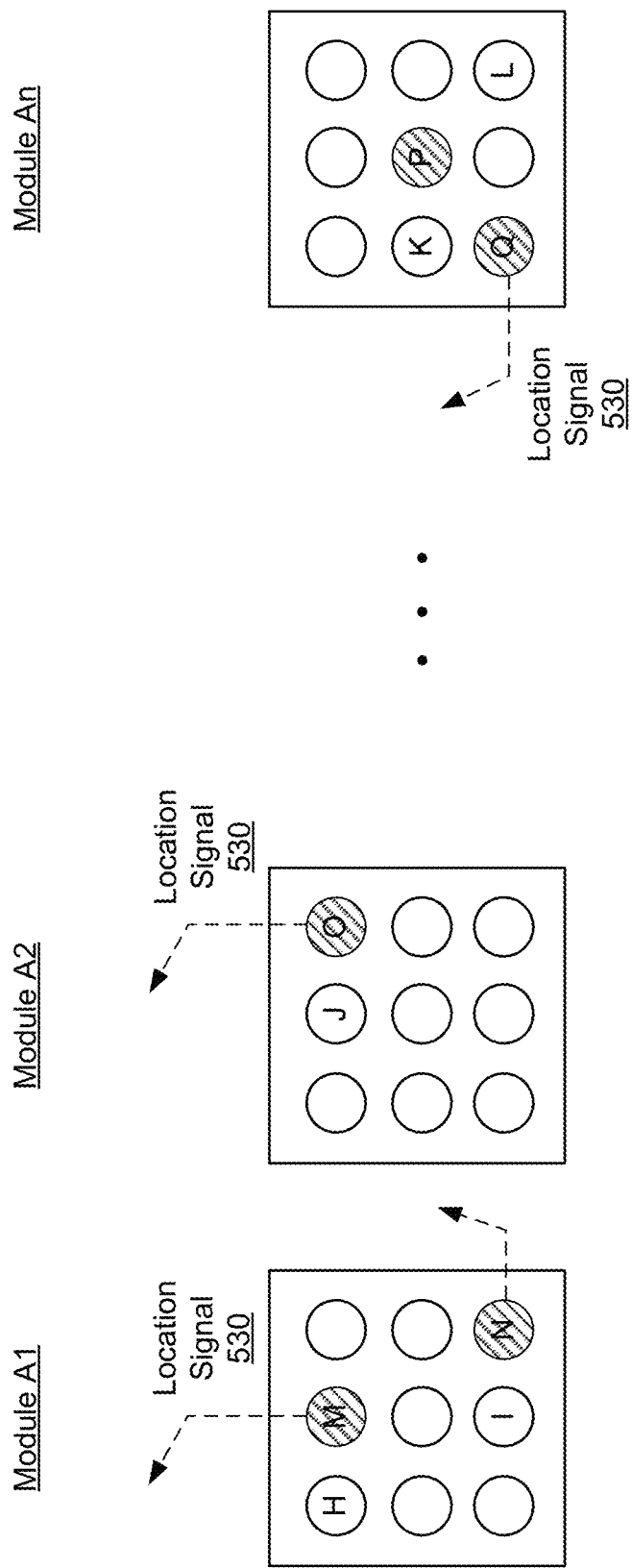

LOCATION PROCESSOR FOR INFERENCING AND LEARNING BASED ON SENSORIMOTOR INPUT DATA

CROSS-REFERENCE TO RELATED APPLICATIONS

The application claims priority under 35 U.S.C. § 119(e) to U.S. Patent Application No. 62/476,409 filed on Mar. 24, 2017 and U.S. Patent Application No. 62/569,379 filed on Oct. 6, 2017, each of which is incorporated by reference herein in its entirety.

BACKGROUND

1. Field of the Disclosure

The present disclosure relates to performing inference on received input data, and specifically relates to performing inference based on sensorimotor input data.

2. Description of the Related Arts

Object detection systems aim to find or recognize different types of objects present in input data. The input data for object detection may be in the form of image data, video data, tactile data, or other types of sensor data. For example, an object detection system may recognize different objects, such as a coffee cup, a door, and the like, included in visual images that are captured by a camera or sensed by tactile sensors.

Conventional object detection systems face many challenges. One of such challenges is that the same object may be placed in different locations and/or orientations. The change in the locations and/or orientations of the objects from the originally learned locations and/or orientation may cause the conventional object detection systems to recognize the same object as different objects. Such problem may be more acute when tactile sensors on, for example, a robotic hand are used to recognize an object. Existing object detection models, such as convolutional neural network models (CNN), are not always sufficient to address the changes in the location and/or locations, and often require significant amounts of training data even if they do address such changes.

Moreover, regardless of the types of sensors, the input data including a representation of an object has spatial features that would distinguish from a representation of another object. The absence of spatially distinctive features may give rise to ambiguity as to the object being recognized. Conventional object detection systems do not adequately address such ambiguity in the objects being recognized.

SUMMARY

Embodiments relate to performing inference. A first input processor receives first input data derived from a first feature of an object. The first input processor generates a first input representation indicating a combination of the first feature and first potential locations on the first candidates of the object associated with the first feature. A location processor determines a first candidate-location representation from the first input representation. The first candidate-location representation indicates the first candidates and the first potential locations on the first candidates. The first input processor receives second input data derived from a second feature of the same object, subsequent to receiving the first input data. The first input processor generates a second input representation indicating a combination of the second feature and second potential locations on second candidates of the object associated with the second feature. The second candidates are a subset of the first candidates. The location processor determines a second candidate-location representation from the second input representation. The second candidate-location representation indicates the second candidates and the second potential locations on the second candidates. The location processor determines the object based at least on the second candidate-location representation.

In one embodiment, the location processor generates location signals representing a prediction on the second input representation based on the first candidate-location representation. The second input representation is generated by the first input processor based further on the location signals.

In one embodiment, at least a subset of the second potential locations is separated from the first potential locations by a predetermined distance.

In one embodiment, the first input processor receives training input data derived from the first feature on a particular location on the object. The location processor generates a candidate-location representation indicating the object and the particular location on the object. The first input processor generates a training input representation indicating a combination of the first feature and the particular location on the object associated with the first feature. The training input representations are associated with the candidate-location representations.

In one embodiment, the training input representation is an activation state of a subset of input cells in the first input processor, and the candidate-location representation is an activation state of a subset of location cells in the location processor. Connections are formed between the subset of location cells in the location processor and the subset of input cells in the first input processor to associate the training input representations with the candidate-location representations.

In one embodiment, the first input representation is an activation state of a first subset of input cells in the first input processor provided to the location processor for generating the first candidate-location representation, and the second input representation is an activation state of a second subset of the input cells in the first input processor provided to the location processor for generating the second candidate-location representation.

In one embodiment, the first input representation indicates an activation of a union of pairs of the first feature and each of the first potential locations on the first candidates, and the second input representation indicates an activation of a union of pairs of the second feature and each of the second potential locations on the second candidates.

In one embodiment, the first input processor generates the second input representation by placing a subset of the input cells including the second subset of the input cells in a predictive state, and activating the second subset of the input cells in the first input processor responsive to the second subset of input cells receiving activation signals associated with the second feature.

In one embodiment, the first candidate-location representation is an activation state of a first subset of location cells in the location processor and the second candidate-location representation is an activation state of a second subset of the location cells in the location processor.

In one embodiment, the location processor generates location signals indicating activation states of a third subset of the location cells generated by shifting the first subset of the location cells. The location signals are provided to the first input processor for generating the second input representation.

In one embodiment, the location cells of the location processor are arranged into a plurality of modules. Each module includes a corresponding subset of the location cells that represent locations separated by an interval in a space surrounding the candidates.

In one embodiment, the first input data and the second input data are generated by a sensor detecting properties of the object.

In one embodiment, the location processor generates a body-location representation corresponding to the sensor. The body-location representation indicates first estimated locations for a reference point associated with the sensor. The first estimated set of locations for the reference point is generated based on the first locations on the first candidates.

In one embodiment, the location processor receives control information indicating a location of the sensor relative to the reference point associated with the sensor. The first body-location representation is generated further based on the control information.

In one embodiment, a second input processor receives a third input data derived from a third feature by another sensor. The second input processor generates a third input representation indicating a combination of the third feature and third potential locations on third candidates of the object associated with the third feature.

In one embodiment, the body-location representation further indicates second estimated locations for the reference point corresponding to the other sensor. The second estimated locations for the reference point is generated based on the third locations on the third candidates.

In one embodiment, the location processor identifies a subset of the estimated locations for the reference point that correspond to both the sensor and the other sensor. The location processor maintains activation for a third subset of location cells selected from the first subset of location cells. The third subset of location cells are associated with the identified subset of estimated locations for the reference point.

Embodiments also relate to performing inference. A plurality of input processors receive input data associated with features at different locations of an object. The plurality of input processors generate a plurality of input representations. Each input representation indicates a combination of a feature and potential locations of the feature on candidates of the object. A location processor determines a plurality of first candidate-location representations. Each first candidate-location indicates the candidates and the potential locations on the candidates associated with each of the input representations. The location processor generates a plurality of second candidate-location representations selected from the first candidate-location representations that are consistent with relative relationships between the different locations of the object. The location processor determines the object based at least on the plurality of second candidate-location representations.

In one embodiment, the input data is generated by a plurality of sensors to detect the features at the different locations.

In one embodiment, the input data is generated simultaneously by the plurality of sensors.

In one embodiment, the location processor generates a body-location representation indicating a union of estimated locations for a reference point with respect to the object. The second candidate-location representations are selected from the first candidate-location representations based at least on the body-location representation. The body location representation generated by generating, for each sensor, the estimated locations for the reference point with respect to each of the sensors based on a corresponding first candidate-location representation for each of the sensors, and determining the body-location representation as a union of the estimated locations for the reference point with respect to each of the sensors.

In one embodiment, the location processor generates each second candidate-location representation by selecting the candidates and the potential locations on the candidates that are associated with a subset of the estimated locations for the reference point that are consistent with the plurality of sensors.

BRIEF DESCRIPTION OF THE DRAWINGS

The teachings of the embodiments can be readily understood by considering the following detailed description in conjunction with the accompanying drawings.

FIGS. 9A through 9C are diagrams illustrating example activation states of cells in the input processor associated with learning and recognizing different objects, according to one embodiment.

FIGS. 13A through 13D are diagrams illustrating example activation states of cells in the location processor associated with learning and recognizing different objects, according to one embodiment.

DETAILED DESCRIPTION OF EMBODIMENTS

Figure 1:
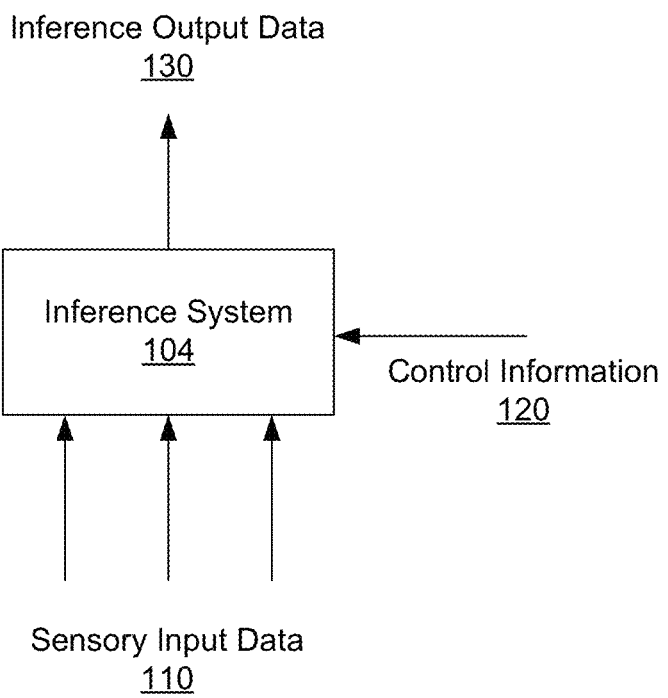
FIG. 1 is a conceptual diagram of an inference system, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to performing inference based on sensory inputs and control information associated with the sensory inputs. The sensory inputs are derived from one or more features of the objects. The control information describes movement of the sensors or known locations of the sensors relative to a reference point. For a particular object, an inference system learns a set of object-location representations of the object where the object-location representation is a unique characterization of an object-centric location relative to the particular object. The inference system also learns a set of feature-location representations associated with the object-location representation that indicate presence of features at the corresponding object-location pair. The inference system can perform inference on an unknown object by identifying candidate object-location representations consistent with feature-location representations observed from the sensory input data and control information.

A location described herein refers to a position or site of an object that are associated with certain features. The location may be physical (e.g., spatial), logical (location within a logical hierarchical structure) or a combination of both. The location may be encoded in various scheme including but not limited to sparse distributed representation.

A feature of an object described herein refers to properties associated with a location of the object. The same feature may be shared across multiple objects or multiple locations on the same object. The feature may include, but is not limited to, a 3-D geometry of a shape, amount of traffic flow at a node.

High-Level Overview of Inference System

FIG. 1 is a conceptual diagram of an inference system 104, according to one embodiment. The inference system 104 performs inference based on sensory input data 110 received from one or more sensors that move relative to the world, and control information 120 associated with the sensory input data 110. In one particular embodiment referred throughout the remainder of the specification, the inference system 104 performs inference on objects and generates inference output data 130. For example, the inference system 104 may receive sensory input data 110 corresponding to sensors at different locations on an unknown object, and perform object recognition based on the received sensory input data and the control information 120. As another example, the inference system 104 can predict sensory input data 110 at a particular location on a given object. However, it is appreciated that in other embodiments, the inference system 104 may be applied to any situation where a set of sensors probe different locations of a system. For example, the inference system 104 may be applied to inputs received from an online probe that navigates and measures different parts of a network in the cloud.

The sensory input data 110 may include, among others, images, videos, audio signals, sensor signals (e.g., tactile sensor signals), data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The underlying representation (e.g., photo, audio and etc.) can be stored in a non-transitory storage medium. In the following, the embodiments are described primarily with reference to a set of tactile sensors on a robotic hand, merely to facilitate explanation and understanding of the inference system 104.

In one embodiment, the sensory input data 110 is encoded into a vector signal and fed to the inference system 104.

The control information 120 indicates movement of the sensors or known locations of the sensors relative to a reference point. In one embodiment, the control information 120 encodes the locations of the sensors using an egocentric frame of reference, or a system-centric frame of reference. In other words, coordinates indicating the movement or locations of sensors are determined relative to the system containing the sensors. For example, the control information 120 may indicate locations of sensors relative to a reference location of a controller included in the robotic hand that controls the movement of the sensors. The location may be physical location, logical location, or a combination of both. The received control information 120 can be encoded in a sparse distributed representation using, for example, a method as described in U.S. Patent Publication No. 2016/0217164, which is incorporated by reference herein in its entirety.

The inference system 104 may process the sensory input data 110 and control information 120 to produce an output representing, among others, identification of objects, identification of recognized gestures, classification of digital images as pornographic or non-pornographic, identification of email messages as unsolicited bulk email ('spam') or legitimate email ('non-spam'), identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. In the following, the embodiments are described primarily with reference to the inference system that recognizes objects to facilitate explanation and understanding of the inference system 104.

Figure 2:
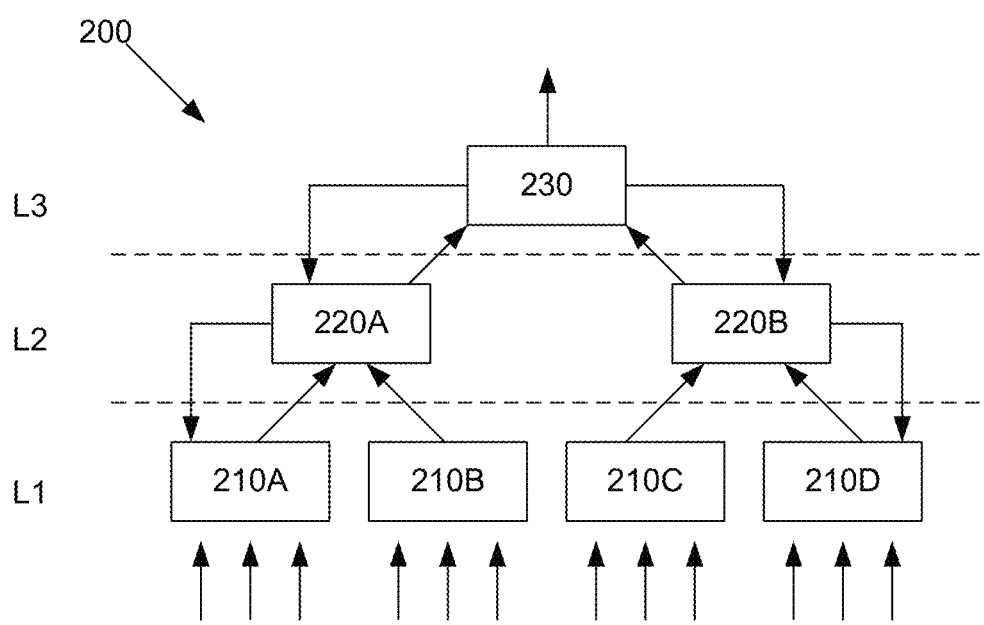
FIG. 2 is a conceptual diagram of multiple inference systems organized in a hierarchical manner, according to one embodiment.

FIG. 2 is a conceptual diagram of multiple inference systems organized in a hierarchical manner, according to one embodiment. Such a hierarchical structured system is referred to as a hierarchical inference system 200. In a hierarchical inference system 200, multiple inference systems learn to perform inference and predict at different levels of abstraction. The system 200 has three levels L1, L2, and L3, where level L1 is the lowest level, level L3 is the highest level, and level L2 is an intermediate level between levels L1 and L3. The hierarchical inference system 200 is hierarchically structured so that the processing nodes cover a larger input space as the level ascends. Level L1 includes inference systems 210A, 210B, 210C, and 210D; level L2 includes inference systems 220A and 220B; and level L3 has inference system 230. Inference systems 210A, 210B, 210C, 210D, 220A, 220B, and 230 are hierarchically connected in a tree-like structure such that each inference system has several children nodes (that is, inference systems connected at a lower level) and one parent node (that is, an inference system connected at a higher level). In one embodiment, an inference system at a child node may be connected to multiple parent nodes. For example, inference system 210B may be connected to inference systems at 220A and 220B.

Further, the hierarchical inference system 200 propagates inference output data up the hierarchy and propagates top-down signals down the hierarchy. That is, each inference system 210A, 210B, 210C, 210D, 220A, 220B, and 230 may be arranged (i) to propagate information up the hierarchy to a connected parent node, and (ii) to propagate information down the hierarchy to any connected children nodes.

Such a hierarchical inference system 200 is advantageous, among other reasons, when learning is performed by a first set of sensors, but inference is performed by a second set of sensors different from the first set. For example, the inference system 220A associated with a set of tactile sensors may be used to learn objects, and the inference system 220B associated with a set of image sensors may be used to perform inference on the object. Another advantage is the increased capacity to learn using multiple inference systems. The number of levels and arrangement of processing modes in FIGS. 1 and 2 are merely illustrative. Many variants of a hierarchical inference system may be developed and deployed depending on the specific application.

Example Object Recognition

An object can be characterized by a set of features at corresponding locations on the object, hereinafter referred to as feature-location representations. Different objects can be defined by a set of different pairs of features and locations that appear on the object. By identifying the different feature-location representations as they appear during inference, different objects can be recognized. If two objects share some feature-location representations, the two objects may be indistinguishable until a distinctive feature-location representation is encountered.

The inference system 104 learns a set of object-location representations for different types of objects that can be used to identify unknown objects during inference. Specifically, for a particular object, the inference system 104 determines representations for a set of object-location pairs of the object. Each object-location representation may be a unique characterization of a corresponding location on the object, and can be sufficient alone to identify the type of object during inference. In one instance, the object-location representation represents a location on the object within an allocentric frame of reference, or an object-centric frame of reference. In other words, an object-location representation may indicate a location relative to the object itself (e.g., center of an object), rather than relative to the system containing the sensors. The set of object-location representations for a given object may be related to one another in that the representation for a first object-centric location can be generated from the representation for a second object-centric location based on the relative location from the second location to the first location.

The inference system 104 also learns a set of feature-location representations associated with the object-location representations that indicate the presence of sensory features at those object-locations of the object. The inference system 104 can perform inference on an unknown object by identifying candidate object-location pairs consistent with feature-location representations observed from the sensory input data 110 and control information 120. Specifically, as additional sensory input data 110 and control information 120 are received, the inference system 104 narrows the candidate object-location representations to those that are consistent with the new observed feature-location representations to identify the object.

In one embodiment, the inference system 104 for a given sensor includes a set of modules that generate the object-location representations, where each module represents a mapping of the space around the sensors and objects to a coordinate system. Specifically, the set of modules may each represent any set of periodic points in the object or system-centric space with respect to the coordinate system of the module, in which the relative distances and orientations between the points are characterized with respect to a set of mapping characteristics associated with the module. In one instance, each module includes one or more cells that represent the periodic points in the object or system-centric space. The fixed number of cells included in a particular module represent one single "tile space" or in other words, a subset of the periodic points, in which points outside the tile space are additionally represented by cells in an additional tile space placed alongside the current tile space.

In one embodiment, the set of modules may have different mapping characteristics from one another in how they represent the relative location (e.g., relative distance and orientation) between points in the object or system-centric space. For example, modules may differ with respect to the resolution or frequency in which the points are mapped to the space, the orientation of the coordinate system associated with the module, and the like. For example, for a given coordinate system orientation centered around the object, the cells of a first module may represent points that are 10 cm apart from each other in the object-centric space, while the cells of a second module may represent points that are 20 cm apart from each other in the object-centric space. Although a single cell in a module corresponds to multiple periodic locations in the object or system-centric space, a group of cells from different modules may be sufficient to uniquely identify a particular location in the space. Thus, even though each module may have a small number of cells, the set of modules as a whole allow the inference system 104 to represent a significantly large number of locations in the space depending on the combination of cells that are selected from the set of modules that can greatly reduce the necessary computational infrastructure and learning.

In such an embodiment, an object-location representation can be represented as a collection of activated cells across the set of modules. Specifically, the object-location representation for a first location relative to an object can be generated from the object-location representation for a second location relative to the object by shifting the activated cells of the second representation based on the distance from the second location to the first location. The operations of modules are described below in detail with reference to FIGS. 11 and 14.

Figure 3:
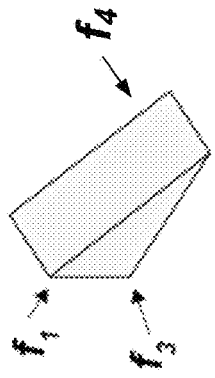
FIG. 3 is an example illustration of a cube object and a wedge object characterized by the inference system, according to one embodiment.
Figure 3:
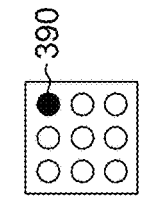
Figure 3:
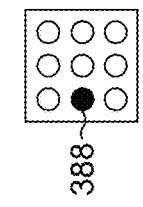
Figure 3:
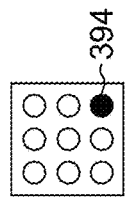
Figure 3:
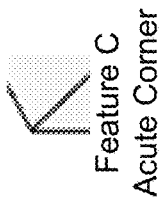
Figure 3:
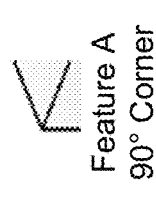
Figure 3:
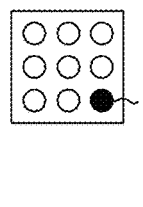
Figure 3:
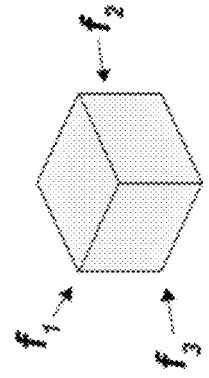
Figure 3:
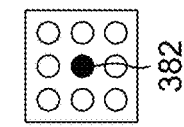
Figure 3:
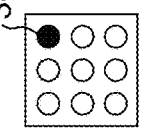

FIG. 3 is a conceptual diagram illustrating an example of a cube object and a wedge object characterized by the inference system 104, according to one embodiment. As shown in FIG. 3, for example, a set of allocentric locations $\{f_1, f_2, f_3, f_4\}$ are defined for objects. A cube object can be characterized by pairs of spatial features and locations, e.g., spatial feature A representing a 90° corner at location $f_1$, spatial feature B representing a vertical edge at location $f_2$, and spatial feature A at location $f_3$. Similarly, a wedge object can be characterized by different pairs of spatial features and locations, e.g., spatial feature C representing an acute corner at location $f_1$, spatial feature A at location $f_3$, and spatial feature D representing an angled edge at location $f_4$.

Also shown in FIG. 3, the inference system 104 includes two modules, module 1 and module 2, that each include one or more cells representing mapping of an object-centric space. For the sake of simplicity, FIG. 3 illustrates a set of example modules for a single tactile sensor of a robotic hand. In this example, the resolution of the mapping for module 2 is twice the resolution of the mapping for module 1. Also for the sake of simplicity, the cells shown in FIG. 3 are arranged based on the relative locations that they represent from one another.

Specifically, the object-location representation of location $f_1$ of the cube object is the activated cell 380 in module 1 and the activated cell 382 in module 2. These cells 380, 382 are associated with a feature-location representation (not shown) that indicate presence of sensory feature A at the object-location $\{cube, f_1\}$. The object-location representation of location $f_3$ of the cube object is the set of activated cells 384 and 386. The object-location representation for the object-location $\{cube, f_3\}$ can be generated by shifting the activated cells 380, 382 downward 1 unit for module 1, and downward 2 units for module 2. These cells are associated with a feature-location representation (not shown) that indicate presence of sensory feature A at the object-location $\{cube, f_3\}$.

Similarly, the object-location representation of location $f_1$ of the wedge object are the activated cells 388 and 390, and the object-location representation of location $f_3$ of the wedge object are the activated cells 392 and 394. Both object-location representations are associated with corresponding feature-location representations (not shown). Although the object-location representation of cells 380, 382 and the object location representation of cells 388, 390 both correspond to the allocentric location $f_1$ of an object, the representations are different from one another since activation of cells 380, 382 represents the location $f_1$ relative to the cube object, and the activation of cells 388, 390 represents the location $f_1$ relative to the wedge object. Thus, for each of the cube or wedge object, any object-location representation may be unique to the object, and thus, be sufficient to identify the object during a subsequent inference process.

The example in FIG. 3 illustrates how different locations relative to objects can be uniquely represented using a combination of active cells in the set of modules. Although each activated cell conceptually represents a set of periodic locations in the object-centric space, the combination of activated cells from the set of modules can uniquely represent a particular location on a particular object that is unique to the object. Thus, the inference system 104 can represent a significantly large number of objects using the cells of the set of modules with a relatively small amount of computing resources. In addition, the object-location representation for a new location on the particular object can easily be computed by shifting the object-location representation depending on the movement of sensors.

Figure 4:
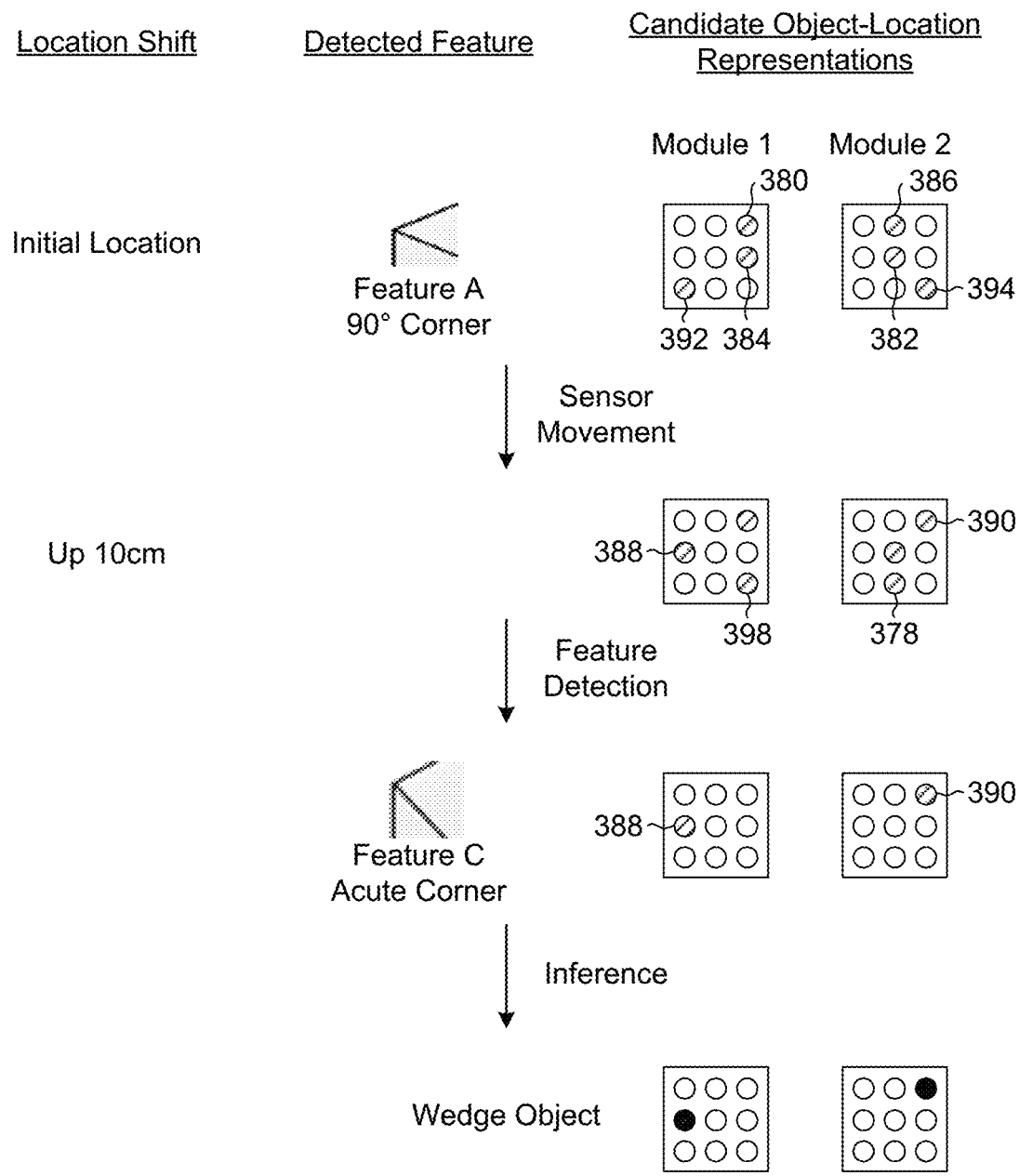
FIG. 4 is an example process of performing inference on a cube object, according to one embodiment.

FIG. 4 is an example process of performing inference on a cube object, according to one embodiment. During an inference process for identifying an unknown object, the inference system 104 detects features of the object from sensory input data 110 of the sensors and identifies a set of feature-location representations that are associated with the detected feature. The feature-location pairs represent known or estimated presence of the detected feature at a set of candidate object-locations that were, for example, previously identified through a learning process. Based on the identified set, the inference system 104 identifies the corresponding representations of the set of candidate object-location pairs. The set of candidate object-location representations indicates possible sensing of the sensor at these corresponding object-locations.

As shown in FIG. 4, the inference system 104 detects feature A at an initial unknown location of the object. The inference system 104 identifies a set of feature-location representations (not shown) for detected feature A. For example, the feature-location representations may represent presence of feature A at a set of candidate object-location pairs. Based on the identified feature-location representations, the inference system 104 identifies a set of candidate object-location representations that correspond to the set of candidate object-location pairs. Specifically, the set of candidate object-location representations includes a set of activated cells 380, 384, 392 in module 1, and a set of activated cells 382, 386, 394 in module 2 that collectively correspond to possible sensing of object-locations {cube, $f_1$}, {cube, $f_3$}, and {wedge, $f_3$}, as shown by the cells in the hashed pattern.

The inference system 104 moves the sensors, and updates the candidate set of object-location representations according to the movement. The updated set of candidate object-location representations indicates a new set of candidate object-location pairs due to movement of the sensor. Specifically, the previous set of candidate representations is shifted to the new set of candidate representations based on determined location shifts for each module. Specifically, the location shifts are transformations of the sensor movements with respect to the mappings represented by each module. In one embodiment, the inference system 104 receives control information 120 on sensor movements from one or more controllers that control movement of actuators that are responsible for moving the sensors to new locations. For example, a controller may use gyroscope or accelerometer sensors in the robotic finger to determine how much the robotic finger has moved.

Returning to the example shown in FIG. 4, the inference system 104 moves the sensor "upwards by 10 cm" from the initial unknown location on the object. The inference system 104 transforms the sensor movement to a location shift of 1 unit upwards in module 1 and a location shift of 2 units upwards in module 2. The previous activations are shifted to the updated set of activations based on the determined location shifts. Consequently, the updated set of candidate object-location representations includes activated cells 380, 388, 398 in module 1, and activated cells 382, 378, 390 in module 2.

The inference system 104 detects new features from additional sensory input data 110 at the new location. The inference system 104 identifies an updated set of feature-location representations based on the additional sensory input data 110 and the currently activated set of object-location representations. Specifically, the updated set of feature-location representations indicates known or estimated presence of the newly detected feature within a subset of the currently activated object-location pairs that were, for example, also previously identified through the learning process. In a subsequent step, the inference system 104 narrows down the set of candidate object-location representations to include only those in the subset. The narrowed down subset indicates possible sensing of the sensor at these object-location pairs based on the new sensory features.

The process of narrowing down the set of candidate-object locations is repeated until, for example, a single object-location representation remains. The inference system 104 outputs the identified object as inference output data 130. In this manner, the inference system 104 can identify objects even if specific allocentric locations on the object are unknown. In addition, the inference system 104 can perform inference independent of the orientation or location of the object relative to the set of sensors. For example, the inference system 104 can perform inference on a soda can object independent of whether the object is sensed by sensors standing up or lying on its side.

Returning to the example shown in FIG. 4, the inference system 104 detects feature C at the new location on the object. The set of feature-location representations (not shown) are updated to those that are consistent with feature C and the current set of candidate object-location representations. The set of candidate object-location representations are in turn narrowed down to only those cells that are associated with the newly detected feature C. In the example shown in FIG. 4, the set of candidate object-location representations are narrowed down to active cells 388, 390, as these cells are the only cells associated with newly detected feature C. As shown in FIG. 4, cells 388, 390 are used to perform inference, as shown by cells with solid patterns. The inference system 104 outputs the wedge object as the inference output data 130, since cells 388, 390 correspond to a representation of a location relative to the wedge object.

Architecture of Inference System

Figure 5:
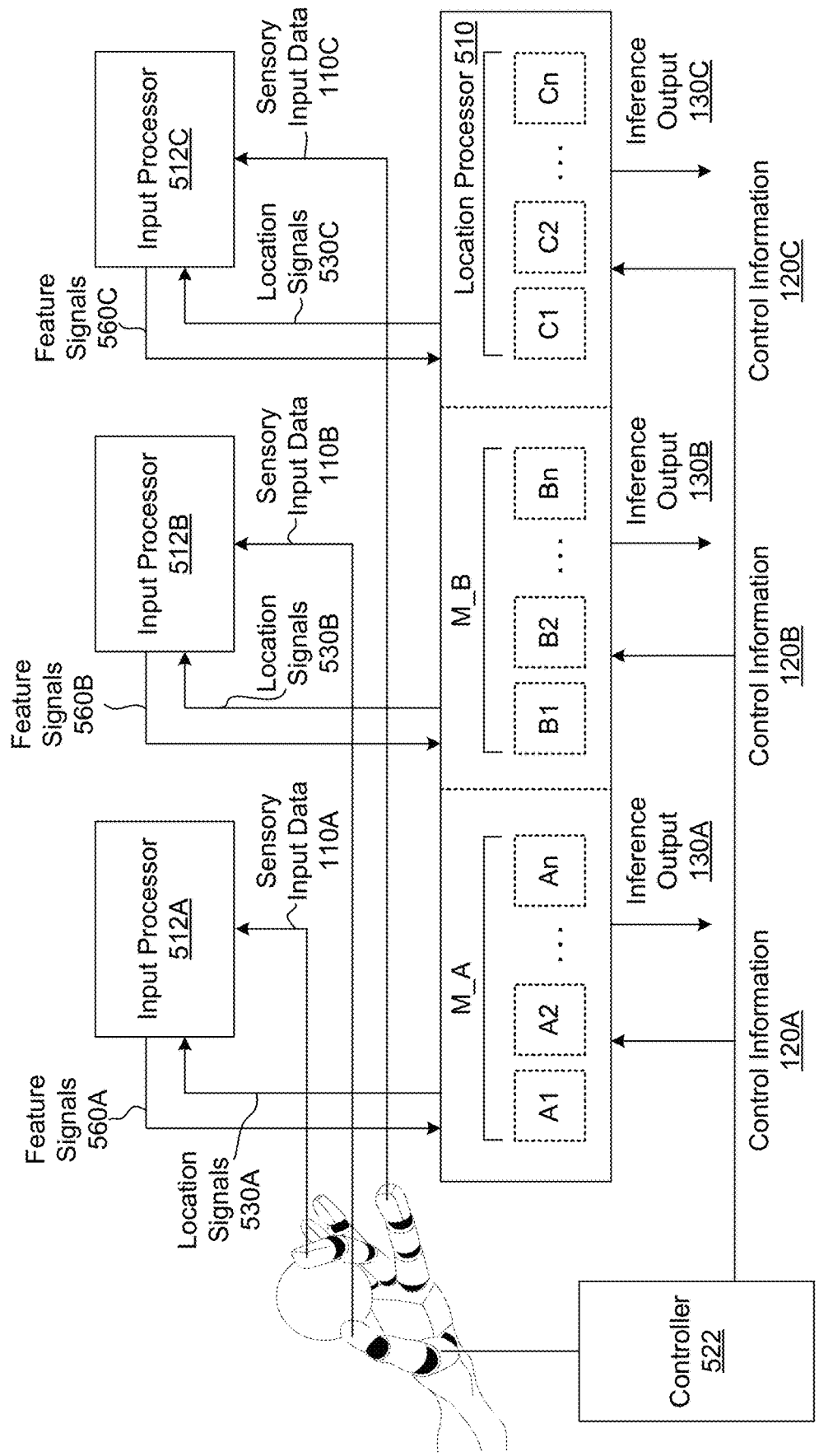
FIG. 5 is a detailed block diagram illustrating an inference system, according to one embodiment.

FIG. 5 is a detailed block diagram illustrating an inference system 104, according to one embodiment. The inference system 104 shown in FIG. 5 includes, among other components, a location processor 510, input processors 512A, 512B, 512C, and a controller 522. Location processor 510 includes a set of modules M_A={A1, A2, . . . , An} associated with input processor 512A, a set of modules M_A={B1, B2, . . . , Bn} associated with input processor 512B, and a set of modules M_C={C1, C2, . . . , Cn} associated with input processor 512C. The number of sets of modules and their arrangements are merely illustrative.

Input processor 512A and the set of modules M_A correspond to sensor A in a set of tactile sensors. Input processor 512B and the set of modules M_B correspond to sensor B in the set of sensors. Input processor 512C and the set of modules M_C correspond to sensor C correspond to sensor C in the set of sensors. Although input processors 512A, 512B, 512C and the set of modules M_A, M_B, M_C corresponding to a set of three sensors A, B, C are shown in FIG. 5, in practice, there may be fewer or more components depending on the number of sensors. The set of sensors may be the same type of sensors (e.g., tactile sensor) or a combination of different types of sensors (e.g., a visual and a tactile sensor).

The input processor 512 generates feature-location representations for a corresponding sensor. The input processor 512 includes, among other components, a plurality of cells organized into columns. Each column may be associated with a sensory feature. The presence of a particular feature-location representation (e.g., spatial feature A at an object-centric location relative to a particular object) is represented by a subset of activated cells in the input processor 512. Thus, a set of candidate feature-location representations are generated by activating the cells associated with each representation in the input processor 512. Specifically, cells in the input processor 512 are activated responsive to receiving sensory input data 110 and location signals 530 from the location processor 510 indicating activation of object-location representations associated with the cells. The input processor 512 in turn provides activation states of cells as feature signals 560 to cells of the location processor 510.

In the embodiment shown in FIG. 5, input processor 512A receives sensory input data 110A including features detected by sensor A and location signals 530A from the set of modules M_A for sensor A. Similarly, input processor 512B and input processor 512C receive sensory input data 110B, 110C, and location signals 530B, 530C from the corresponding set of modules in the location processor 510. The input processors 512A, 512B, 512C in turn provide activation states of cells (i.e., presence of feature-location representations) to the corresponding modules of the location processor 510 as feature signals 560A, 560B, and 560C.

The location processor 510 generates object-location representations of known or estimated sensing of the sensors on one or more objects. The location processor 510 includes a set of modules that each include one or more cells, as described above in conjunction with FIGS. 3 and 4. The sensing of a sensor at a particular object-location representation is represented by a subset of activated cells in the corresponding set of modules of the location processor 510. The cells in the location processor 510 are activated responsive to receiving control information 120 and feature signals 560 from a corresponding input processor 512 that indicate activation of feature-location representations associated with the cells. The location processor 510 in turn provides activation states of cells as location signals 530 to the input processor 512.

In the embodiment shown in FIG. 5, the set of modules M_A for sensor A may receive control information 120A indicating movement or the system-centric location of sensor A, and feature signals 560A indicating a set of activated feature-location representations in input processor 512A. Similarly, the set of modules M_B for sensor B and the set of modules M_C for sensor C may receive control information 120B, 120C, and feature signals 560B, 560C from corresponding input processors 512B and 512C. The set of modules M_A, M_B, M_C in turn provide information on activation states of cells (i.e., sensing of possible object-location representations) to the corresponding input processors 512A, 512B, 512C as location signals 530A, 530B, 530C.

In one embodiment, the inference system 104 includes a group of modules each associated with a different sensor that represent same mappings of the space. For example, in the embodiment shown in FIG. 5, a group of modules A1, B1, C1 may each represent a corresponding set of periodic points in the object-centric space using a first set of mapping characteristics to determine the relative locations between periodic points, while another group of modules A2, B2, C3 may each represent a corresponding set of periodic points in the object-centric space using a second set of mapping characteristics with a different relative orientation than the first set of mapping characteristics.

The feature signals 560 are provided via feature connections that are connections between a subset of cells in the input processor 512 and a subset of cells in the corresponding set of modules in the location processor 510. Feature connections represent an association between the feature-location representation of the subset of cells in the input processor 512 and the object-location representation represented by the subset of cells in the location processor 510. The location signals 530 are provided via location connections that are connections between a subset of cells in the location processor 510 and a subset of cells in the input processor 512. The subset of cells in the input processor 512 and the corresponding set of modules in the location processor 510 that have feature connections may coincide with the subset of cells that have location connections. In one embodiment, feature connections and location connections between cells may be severed or generating during the learning process of input processor 512 and the location processor 510.

The location processor also outputs inference output data 130 for each set of modules M_A, M_B, and M_C indicating results of inference on an unknown object. Specifically, the set of modules M_A provide inference output data 130A, the set of modules M_B provide inference output data 130B, and the set of modules M_C provide inference output data 130C. The inference output data 130 may indicate an identification of the unknown object (e.g., cube vs. wedge object), or may also indicate the particular location on the object along with the identification of the object.

The controller 522 is hardware or a combination of hardware and software for sending operation signals to actuators (e.g., robotic arm) associated with the movement of sensors that provide sensor inputs 110A, 110B, 110C. The controller 522 also functions as a source of control information 120 that may provide system-centric locations of sensors and movement information of the sensors to the location processor 510. For this purpose, the controller 522 may include, among other components, a processor, a memory, and an interface device for communicating with the actuators and the sensors. The memory can include software components for controlling and operating the actuators (e.g., a motion planning module and an actuator control algorithm).

Learning of Connections for Inference

Figure 6A:
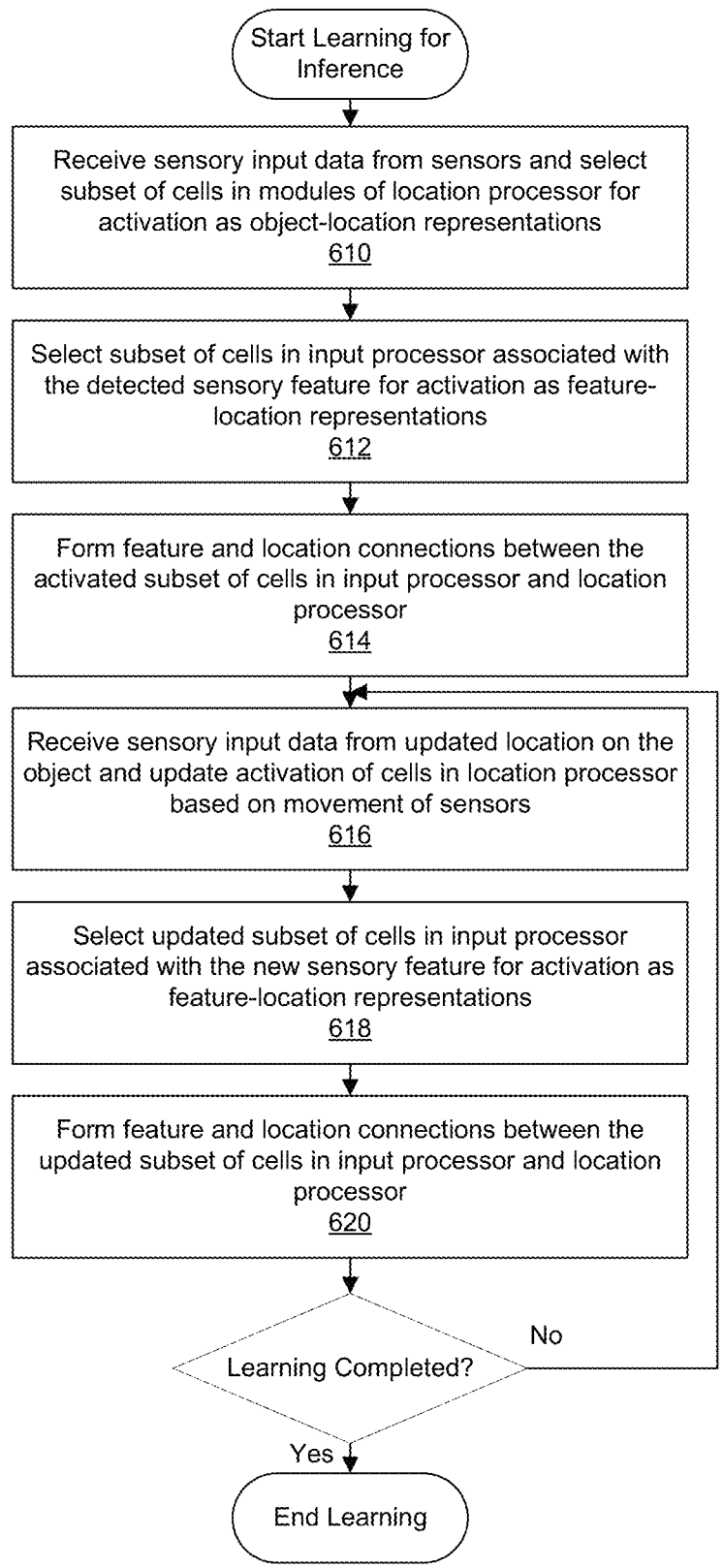
FIG. 6A is a flowchart illustrating a method of learning connections between cells of the input processors and the location processor, according to one embodiment.

FIG. 6A is a flowchart illustrating a method of performing a learning operation to establish connections between cells of the input processors 512 and the location processor 510, according to one embodiment. The steps shown in FIG. 6A are merely illustrative. One or more of these steps may be used in conjunction, selective selected or discarded, and/or varied during operation of the learning process. For example, one or more of these steps may be performed in a parallel operations and not in a particular sequence.

In particular, the process shown in FIG. 6A may be executed for cells in each input processor 512 for a sensor, and the set of corresponding modules in the location processor 510. The inference system 104 establishes connections for an unknown object by selecting a subset of cells in the modules of the location processor 510 for activation as the object-location representation, and forming feature and location connections to a subset of selected cells in the input processor 512 that are associated with the detected feature. The activated cells in the location processor 510 are shifted based on movement of the sensor, and new connections are formed based on the new sensory inputs 110 at the updated location on the object.

Specifically, the system of sensors initially sense a location on the object. The inference system 104 receives 610 sensory input data 110 from the location on the object, and selects a subset of cells in the set of modules of the location processor 510 for activation as the object-location representation. For example, the inference system 104 may randomly select one cell in each module for activation. Based on the sensory input data 110 at the location on the object, the inference system 104 selects 612 a subset of cells in the input processor 512 that are associated with the detected sensory feature for activation as the feature-location representation. For example, the inference system 104 may elect a random cell in each column associated with the sensory feature for activation. A set of feature connections and location connections are formed 614 between the activated subset of cells in the location processor 510 and the input processor 512.

The system of sensors move to a new location on the object. The inference system 104 receives 616 new sensory input data 110 at the updated location on the object. The subset of activated cells in the location processor 510 are updated based on the movement of sensors. Specifically, the subset of activated cells in the location processor 510 may be shifted to a new object-location representation based on the location shift generated by the movement of sensors. Based on the new sensory input data 110 at the location on the object, the inference system 104 selects 618 a subset of cells in the input processor 512 that are associated with the new sensory feature for activation as the feature-location representation. Another set of feature connections and location connections are formed 620 between the updated subset of cells in the location processor 510 and the input processor 512.

The learning process is completed for the particular object when, for example, each sensor has sensed sensory features on a set of allocentric locations on the object. When a new object is learned, the cells in the location processor 510 and the input processor 512 are deactivated, and the process described above is repeated for the new object.

Performing Inference Using the Inference System

Figure 6B:
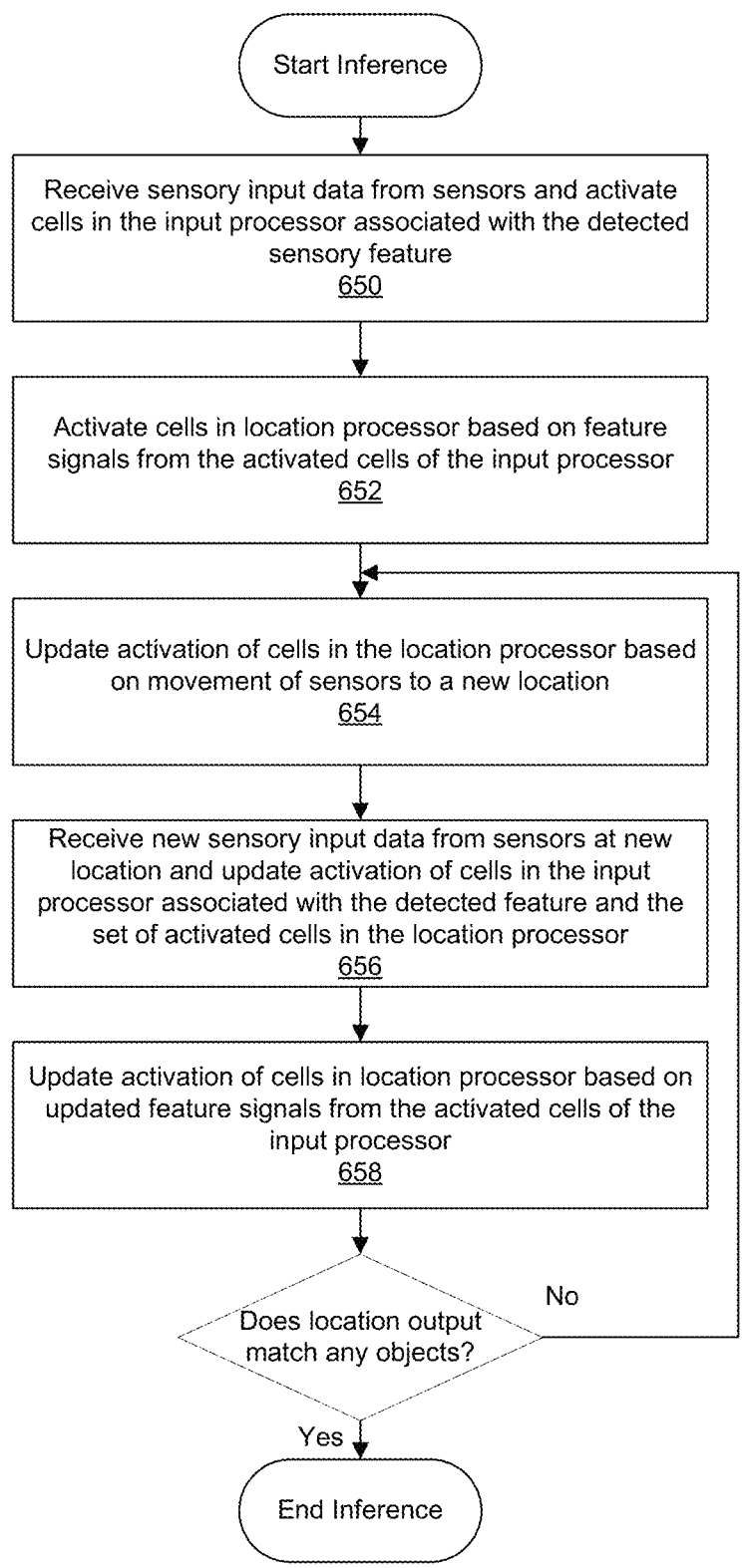
FIG. 6B is a flowchart illustrating a method of performing inference in the inference system, according to one embodiment.

FIG. 6B is a flowchart illustrating a method of performing inference in the inference system 104, according to one embodiment. The steps shown in FIG. 6B are merely illustrative. One or more of these steps may be used in conjunction, selective selected or discarded, and/or varied during operation of the learning process. For example, one or more of these steps may be performed in a parallel operations and not in a particular sequence.

The input processor 512 receives 650 sensory input data 110 for a corresponding sensor on an unknown location of an object, and activates cells associated with the detected feature described in the sensory input data 110. Thus, the combination of activated cells in the input processor 512 represent the collection of feature-location representations associated with the particular feature. The input processor 512 provides the activation states of the cells as feature signals 560 to cells in the location processor 510 that have feature connections with the activated cells in the input processor 512. The location processor 510 activates 652 cells based on the feature signals 560. The combination of activated cells in the location processor 510 represent candidate object-location representations that are associated with the feature-location representations of the input processor 512.

The sensors are moved to a new location on the object, and the location processor 510 updates 654 the set of candidate object-location representations based on the sensor movements. The location processor 510 provides the activation states of the cells as location signals 530 to cells in the input processor 512 that have location connections with the activated cells in the location processor 510. The input processor 512 receives 656 new sensory input data 110 for the sensor on the new location, and updates activation of cells in the input processor 512. Specifically, the input processor 512 activates cells that are associated with the detected sensory feature and receive location signals 530 from the current set of object-location representations. The input processor 512 provides the activation states of cells to the location processor 510, and the location processor 510 updates 658 the activation of cells to a subset of those that receive feature signals 560 from the input processor 512.

In one embodiment, each feature and location connection is associated with a permanence value indicating frequency of the connection. In other words, the permanence value for a location connection indicates frequency of cell activations in the input processor 512 due to activation of cells in the location processor 510 connected to the active cells through location connections. The permanence value for a feature connection indicates frequency of cell activations in the location processor 510 due to the activation of cells in the input processor 512 connected to the active cells through feature connections. The permanence value may be adjusted through the learning process to sever existing location or feature connections or generate new connections.

The inference process is completed for the particular object when, for example, the candidate object-location representations correspond to a single object. When a new object is to be inferred, the cells in the location processor 510 and the input processor 512 are deactivated, and the process described above is repeated for the new object.

Example Architecture of Input Processor

Figure 7:
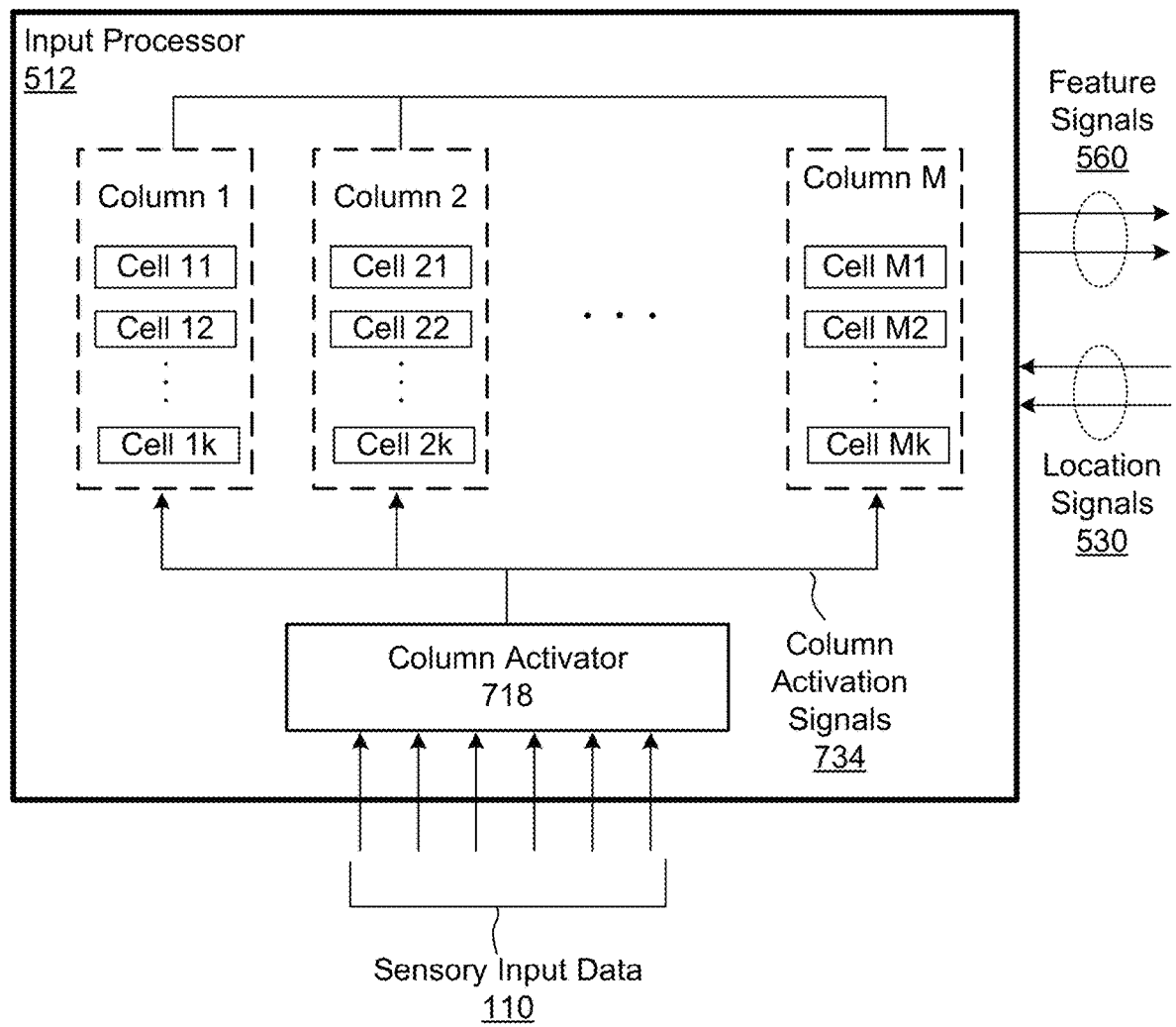
FIG. 7 is a detailed block diagram illustrating an input processor, according to one embodiment.

FIG. 7 is a detailed block diagram illustrating an input processor 512, according to one embodiment. Input processor 512 may include, among other components, columns of cells 11 through Mk (in dashed boxes), and a column activator 718. The column activator 718 is a software, hardware or a combination thereof that receives sensory input data 110 and generates column activation signals 734 indicating which columns of cells are to be activated based on the received sensory input data 110. One or more column activation signals 734 may represent presence of particular features in the sensory input data 110. For example a subset of column activation signals 734 may represent presence of a curved surface in the sensory input data 110, while another subset of column activation signals 734 may represent presence of a corner in the sensory input data 110.

The input processor 512 also receives location signals 530 from the corresponding set of modules of the location processor 510. The location signals 530 are fed to a subset of cells in the input processor 512 with location connections to the cells that originate the location signals 530. As discussed previously, the location signals 530 indicate potential activation of a subset of cells in the location processor 510 that are associated with one or more candidate object-location representations, and represent known or potential sensing of the corresponding sensor at those object-location pairs.

In one embodiment, each column includes the same number (N) of cells. A cell in the input processor 512 has three states: inactive, predictive, and active. As described in more detail below, a cell may become activated (i.e., in an active state) if the cell receives a column activation signal 734 when it is previously in a predictive state. When a cell in a column becomes activated, the active cell inhibits activation of other cells in the same column except in certain limited circumstances. The predictive state represents a prediction that the cell will be activated by the column activation signal 734 at a next time step. A cell may become predictive (i.e., in a predictive state) in response to receiving location signals. A cell that is in neither an active state nor a predictive state is referred to as inactive (i.e., in an inactive state).

In one embodiment, cells are activated if the cells are previously in a predictive state and receive column active signals 734 at a subsequent time step. For example, a subset of cells that receive location signals 530 may become predictive. Predictive cells that subsequently receive column activation signals 734 generated based on the received sensory input data 110 are activated. In this manner, only the subset of cells in the input processor 512 that are consistent with the sensory input data 110 and the set of currently active object-location representations are activated.

In one embodiment, if cells in a predictive state were predictively active due to location signals 530 transmitted through location connections, and sensory input data 110 resulted in correct activation of the cell, the permanence values for location connections of the cells to activated cells in the input processor 512 are increased whereas the permanence values for connections to inactivated cells in the location processor 510 are decreased. On the other hand, if cells in the predictive state are not followed by activation of the cells, the permanence values for location connections to activated cells in the location processor 510 are decreased. If a permanence value for a connection drops below a threshold value, the connection may be severed. In this manner, location connections between cells with low permanence values no longer contribute to activation of cells in the input processor 512.

Continuing with the example, if no cell in the column is currently in a predictive state and the column receives a column activation signal 734, one or more of the cells (e.g., all of the cells) in the column can be randomly selected and activated. When no cell in the column is currently in a predictive state, cells in the column may be activated based on, for example, recent history of activation. Specifically, the cell most recently activated in the column may be selected for activation. Alternatively, all cells in the column may be activated if no cell in the column is currently in a predictive state. In another embodiment, one or more cells in the column are activated even though other cells are in the predictive state in the same column.

The input processor 512 also generates feature signals 560 based on the activation of cells 11 through Mk. In one embodiment, the feature signals 560 indicate which cells are activated in the form of a concatenated vector. For example, the activation of each cell may be represented as a binary value or a two-bit binary value, with one bit indicating whether the cell is activated and one bit indicating whether the cell was predictive and became active. In another embodiment, the feature signals 560 also include cells that are predictively activated. For example, the activation of each cell may be represented as a binary value or a two-bit binary value, with one bit indicating whether the cell is active and one bit indicating whether the cell is predictive. The concatenated vector may be sent as feature signals 560 of the input processor 512 to a corresponding set of modules of the location processor 510.

Figure 8:
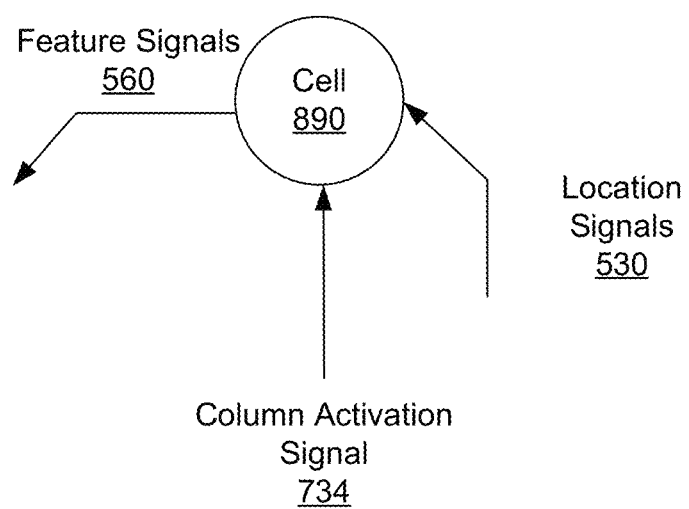
FIG. 8 is a conceptual diagram illustrating signals associated with a cell in the input processor, according to one embodiment.

FIG. 8 is a conceptual diagram illustrating signals associated with a cell 890 in the input processor 512, according to one embodiment. The cell 890 may be a physical or logical construct that takes one of inactive, predictive, and actives based on its previous state and various signals that it receives.

As discussed in reference to FIG. 7, cell 890 receives location signal 530 indicating that the corresponding sensor may be at a known or potential object-location associated with the cell 890. As discussed in reference to FIG. 7, cell 890 may become predictive when it receives location signal 530. Cell 890 also receives column activation signal 734 that may cause activation of the cell 890. In one embodiment, cell 890 becomes active when (i) cell 890 is in a predictive state (e.g., in response to receiving location signal 530), then transitions to an active state in response to the column activation signal 734, and/or (ii) cell 890 is not in a predictive state but is nonetheless activated in response to the column activation signal 734. For example, if the column containing cell 890 receives a column activation signal 734 but no cells in the column are in a predictive state, all cells in the column including cell 790 may be activated.

Example Operation and Function of Cells in Input Processor

Figure 9B:
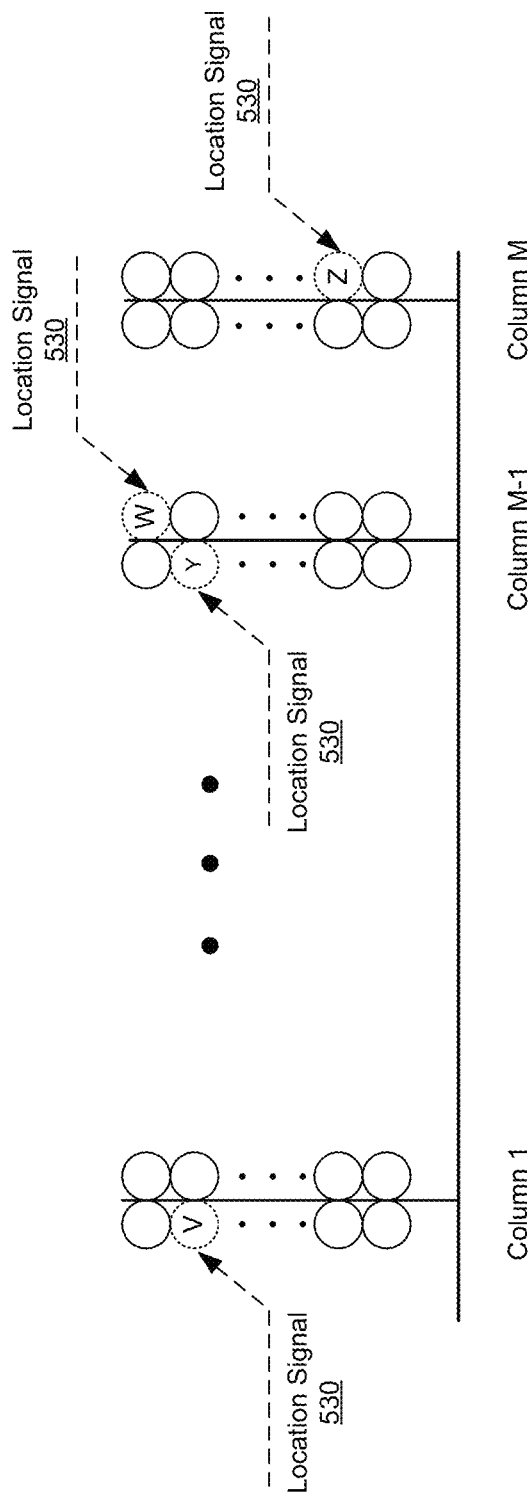
Figure 9C:
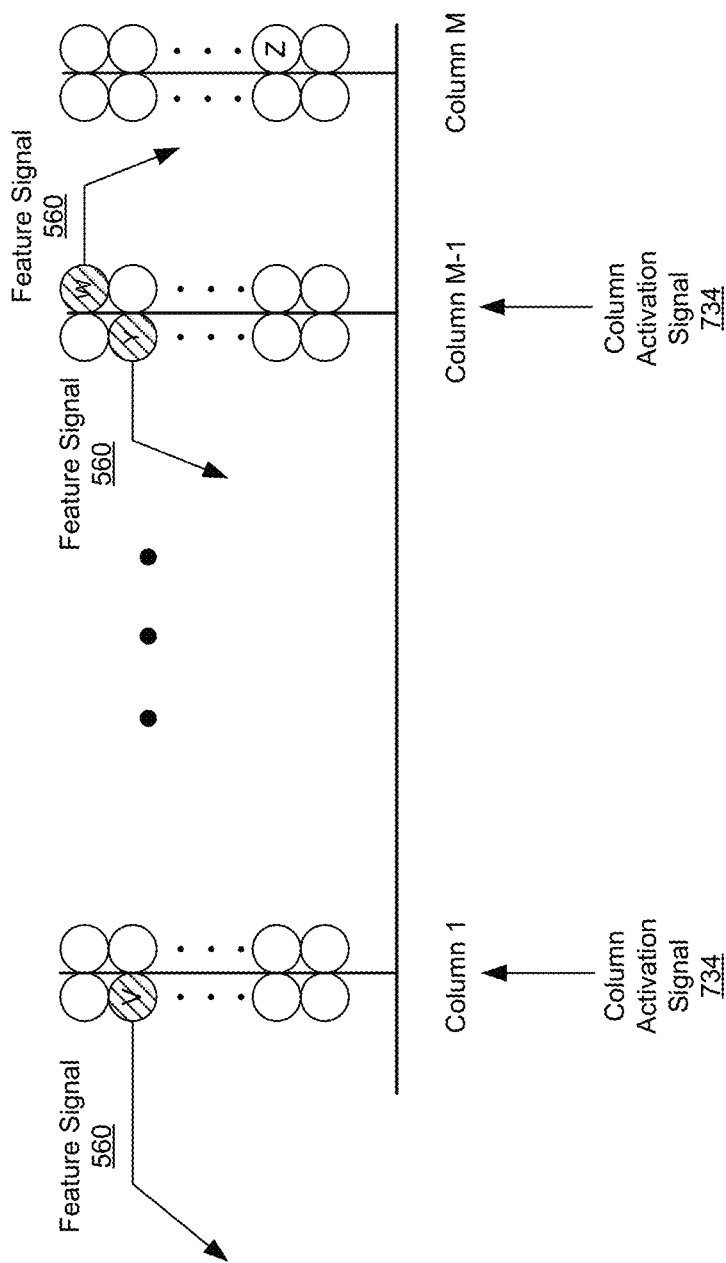

FIGS. 9A through 9C are diagrams illustrating example activation states of cells in the input processor 512 associated with learning and recognizing different objects including object A and object B, according to one embodiment.

Each circle in FIGS. 9A through 9C represents a cell in the input processor 512. A cell with a hashed pattern indicates that the cell is in an active state, while a blank pattern indicates that the cell is in an inactive state. A cell with a dashed circumference indicates that the cell is in a predictively active state. When each cell becomes active, the cell sends out feature signals 560. For sake of simplicity, FIGS. 9A through 9C show an example inference process for an input processor 512 for a single sensor.

FIG. 9A illustrates the input processor 512 receiving sensory input data 110 at an initial location on an unknown object. Based on the received sensory input data 110, column activation signals 734 corresponding to column 1 and column M of the input processor 512 are generated. For example, the column activation signals 734 for column 1 and column M may represent detection of a curved surface on the object. Since initially no cells are in a predictive state, all cells in column 1 and column M are activated as a result of receiving the column activation signals 734. The activation states of the cells are represented in feature signals 560 generated by the columns of cells.

The feature signals 560 then cause activation of cells in the location processor 512 that are connected via feature connections with the activated cells in the input processor 512. The sensor is moved to a new location on the object, and the set of activated cells in the modules of the location processor 512 are updated based on the determined location shift. The updated activation states of the cells are provided to the input processor 512 as location signals 530. The location signals 530 may indicate object-locations for objects A and B that indicate known or estimated sensing of the sensor at those object-locations. For example, the location signals 530 may indicate that object-location representations corresponding to {object A, $f_3$}, {object B, $f_1$}, {object A, $f_2$} are activated.

FIG. 9B shows the operation of cells in the input processor 512 in the next time step, according to one embodiment. As illustrated in FIG. 9B, cells V, Y, and Z are connected to the activated cells in the location processor 510, and hence, receive the location signals 530 from cells in the location processor 510. The location signal 530 places cells V, Y, and Z in a predictive state.

As shown in FIG. 9C, the input processor 512 receives new sensory input data 110. Based on the new sensory input data 110, the column activator 718 generates column activation signals 734 corresponding to column 1 and column M−1 of the input processor 512. For example, column activation signals 734 to column 1 and column M−1 may represent detection of a flat surface on the new location of the object. Since cells V, W, Y were previously in a predictive state, cells V, W, Y are selected for activation. Although cell Z was in a predictive state, cell Z is not activated since column M did not receive a column activation signal 734. The activated states of cells V, Y, W are represented as feature signals 560, and are provided to the associated cells of the location processor 510.

Functional Block Diagram of Cell in Input Processor

Figure 10:
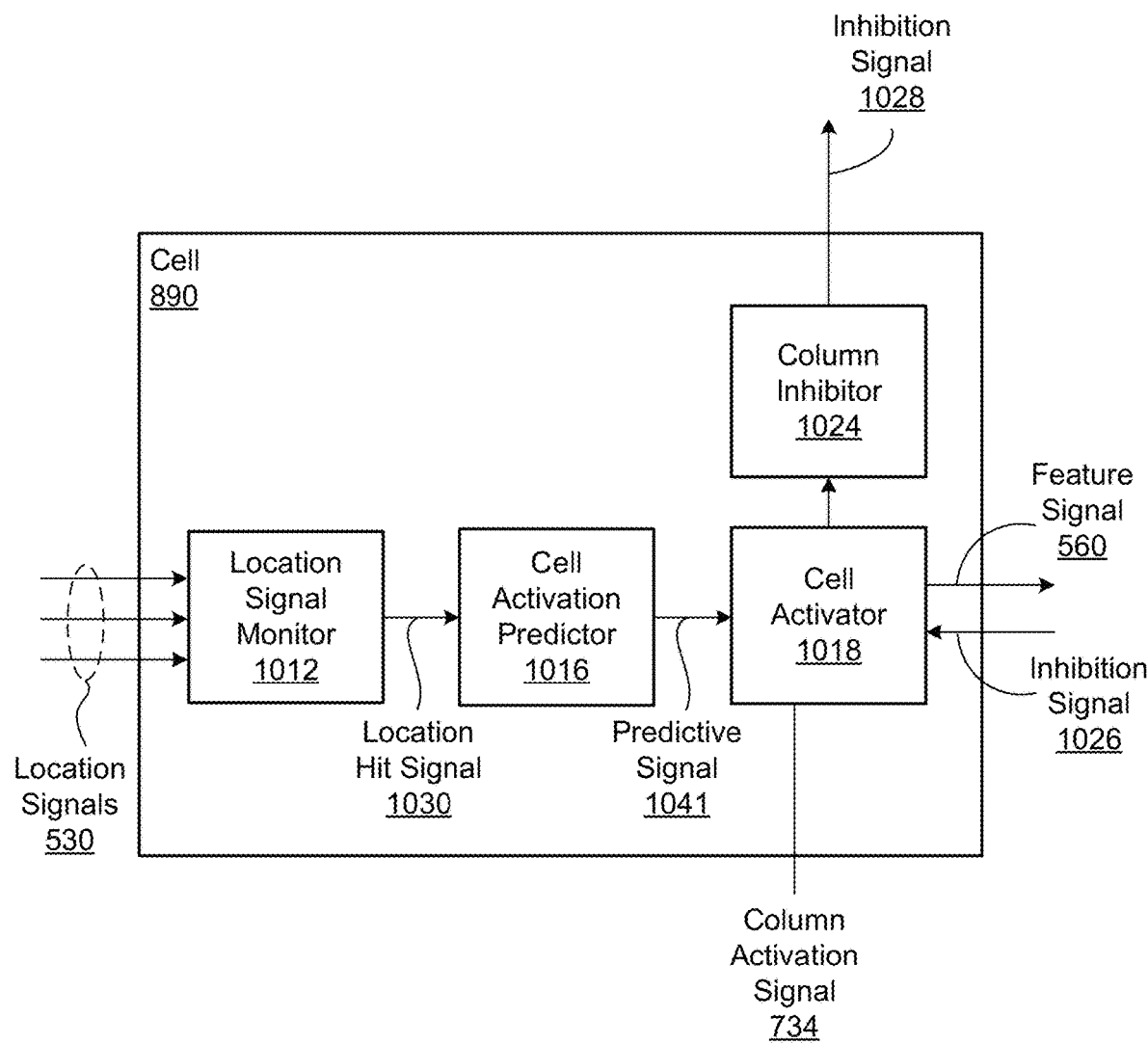
FIG. 10 is a functional block diagram illustrating a cell in the input processor, according to one embodiment.

FIG. 10 is a functional block diagram illustrating cell 890 in an input processor, according to one embodiment. Cell 890 may include, among other components, a location signal monitor 1012, a cell activation predictor 1016, a cell activator 1018, and a column inhibitor 1024. One or more of these components may be embodied in software, firmware, hardware or a combination thereof. Further, cell 890 may include other components not illustrated in FIG. 10.

The location signal monitor 1012 is software, firmware, hardware or a combination thereof for monitoring activation states of cells in a set of modules of the corresponding location processor 510. For this purpose, the location signal monitor 1012 receives the location signal 530 from cells in the location processor 510 connected to the cell 890. If the location signal 530 indicates that one or more cells having location connections to the cell 890 are active, the location signal monitor 1012 sends location hit signal 1030 to cell activation predictor 1016.

The cell activation predictor 1016 is software, firmware, hardware or a combination thereof that places the cell in a predictive state based on location hit signal 1030. In one embodiment, if the location hit signal 1030 is generated, the cell activation predictor 1016 places the cell 890 in a predictive state, and sends predictive signal 1041 indicating that the cell 890 is in a predictive state to the cell activator 1018.

The cell activator 1018 is software, firmware, hardware or a combination thereof that determines whether to place the cell 890 in an activated state according to a set of activation and inhibition rules. For this purpose, the cell activator 1018 receives column activation signal 734, predictive signal 1041, and inhibition signal 1026.

One additional condition for cell activation may be that there be no inhibition signals 1026 from other cells in the same column or in a different column. If inhibition signal 1026 is received from other cells, cell 890 is not activated despite column activation signal 734. If the cell 890 is placed in an activated state, the cell activator 1018 generates feature signals 560 indicating whether the cell is active, or in some cases, was predictive and became active. Optionally, in response to activation of the cell 890 by the cell activator 918, column inhibitor 1024 generates inhibition signal 1028. Inhibition signals 1028 are sent to other cells in the same column or in a different column as the cell 890 to inhibit activation of the other cells in the same input processor 512.

Example Architecture of Location Processor

Figure 11:
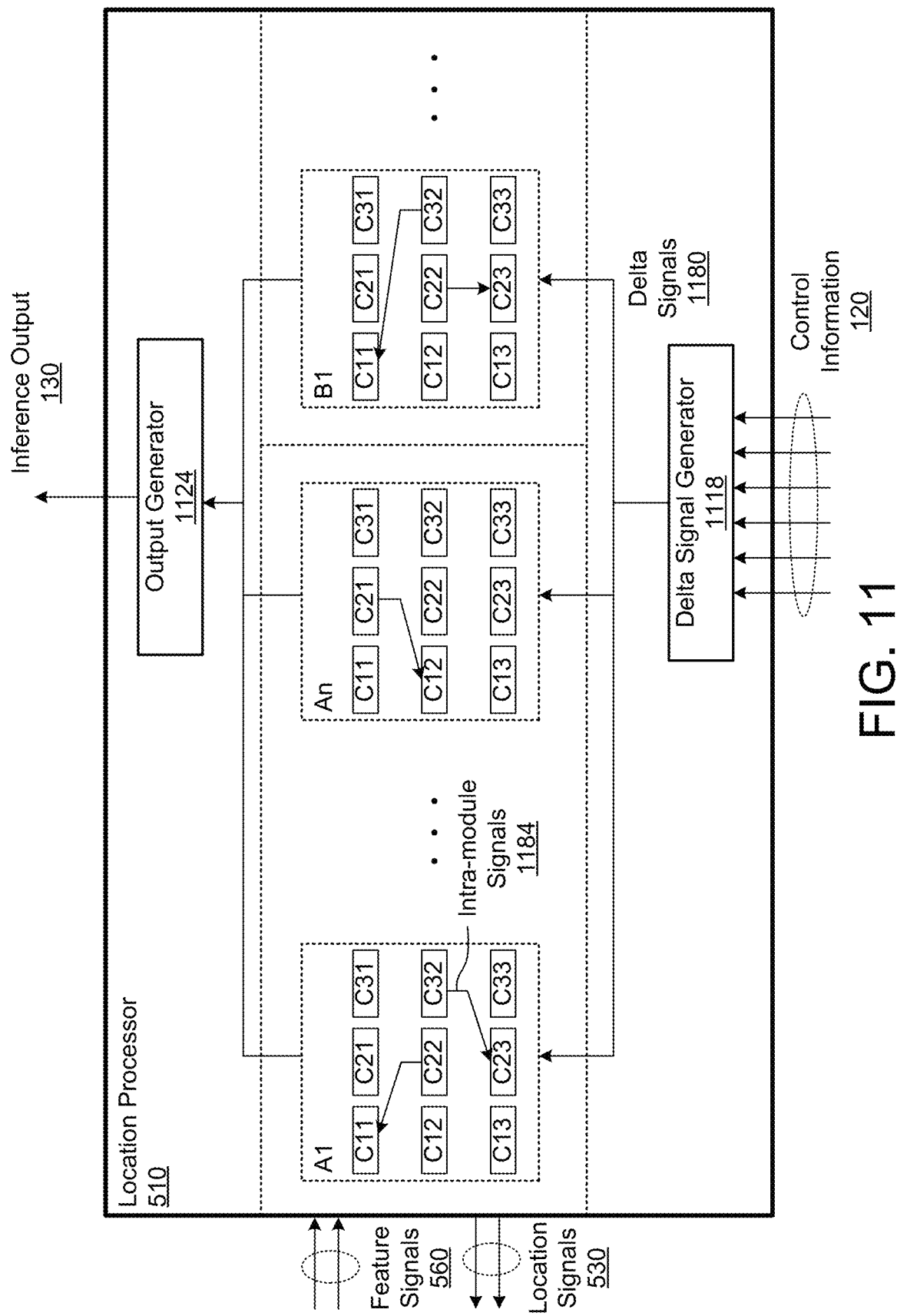
FIG. 11 is a detailed block diagram illustrating a location processor, according to one embodiment.

FIG. 11 is a detailed block diagram illustrating a location processor 510, according to one embodiment. Location processor 510 may include, among other components, a set of n modules per sensor, a delta signal generator 1118, and an output generator 1124. Specifically, the location processor 510 shown in FIG. 11 includes a set M_A of modules A1, . . . , An corresponding to sensor A, a set M_B of modules B1, . . . , Bn corresponding to sensor B, and so on. Each module in the set of n modules may correspond to a different mapping of the space around the object or the system of sensors, and may include one or more cells C11 through Cgm, in which g denotes the number of cells that represent points along a first direction in the tile space represented by a corresponding module, and m denotes the number of cells that represent points along a second direction in the tile space represented by the module. However, the cells in FIG. 11 are merely illustrative, and in practice, a module can include a higher dimension of cells, such as a three-dimensional arrangement of cells that correspond to the three-dimensional space of an object-centric or system-centric space.

The delta signal generator 1118 is a software, hardware, or a combination thereof that receives control information 120 and generates delta signals 1180. Specifically, the delta signal generator 1118 transforms information on sensor movements included in the control information 120 to location shifts in the object-centric space according to the different mapping characteristics of the modules. The determined location shifts are provided to each module as delta signals 1180. For example, responsive to a movement of the sensor A, the delta signal 1180 provided to module A1 may indicate a location shift of 1 unit downwards, while the delta signal 1180 provided to module An may indicate a location shift of 3 units downwards based on the mapping characteristics of the respective module.

A set of modules of the location processor 510 also receive feature signals 560 from the corresponding input processor 512. For example, in the embodiment shown in FIG. 11, the set of modules M_A may receive feature signals 560 from the input processor 512A. The feature signals 560 are fed to a subset of cells in the location processor 510 with feature connections to the cells that originate the feature signals 560. As discussed previously, the feature signals 560 indicate activation of a set of feature-location pairs in the input processor 512, and represent presence of a sensory feature at the object-locations associated with the activated cells of the input processor 512 through feature connections.

In one embodiment, each module that corresponds to the same mapping of the space includes the same number of cells. For example, in the example shown in FIG. 11, modules A1, B1, C1, . . . N1 that use the same mapping characteristics may have the same number of cells. In one instance, each module may include the same number of cells, regardless of the type of mapping characteristics used. The cells in a module may represent different locations within a tile space that can be, for example, significantly smaller than the size of an object. In FIG. 11, the cells are arranged according to their relative locations to one another for ease of description. For example, cell C21 in module A1 represents a location 1 unit right of the location represented by cell C11, and cell C22 represents a location 1 unit downwards of the location represented by cell C22. Each unit in module A1 may correspond to a predetermined movement amount of the sensor, for example, 10 cm.

A cell in the location processor 510 may be inactive or active. An object-location representation corresponds to a subset of activated cells in the location processor 510. In one instance, cells of the location processor 510 become active responsive to receiving feature signals 560 from the corresponding input processor 512 indicating activation of feature-location representations associated with the cells. In another instance, cells of the location processor 510 become active responsive to movement of the sensor. Specifically, cells at a relative location from previously active cells can become active if the relative location corresponds to the location shift generated by the sensor. For example, responsive to movement of the sensor 10 cm downwards, the activation state of cells in module A1 may shift from active cell C12 to cell C13 based on a location shift of 1 unit downwards for module A1.

Cells may be re-used for activation as additional movements are made for the sensor and go beyond the range of the tile space. In other words, the object-centric space may be represented by tiling the cells of the module alongside each other in a repeated manner. For example, responsive to an additional movement of the sensor 10 cm downwards, the activation state of cells in module A1 may shift from cell C13 to cell C11, since there are no other cells past cell C13 within a given tile space, and cell C11 is the next cell downwards if another set of cells were placed below the current set of cells. Thus, each cell in the module may actually represent a series of periodic locations in the object-centric space that arise when the cells of the module are tiled alongside each other to represent the larger object-centric space.

In one instance, cells of a module are connected to each other through intra-module connections 1184. An activated cell in the module can provide intra-module signals 1184 to other cells via the connections to indicate activation of the cell. Responsive to a movement in the sensor, a cell in the module may become activated if it receives both an inter-module signal 1184 from a previously active cell and a delta signal 1180 that indicates a location shift corresponding to the relative location of the cell from the previously active cell. After the cell has been activated, the previously activated cell may be placed in an inactive state.

As discussed previously, the set of object-location representations for an object represent locations relative to the object, and are represented as a set of activated cells across the set of modules for the sensor that are selected during the learning process. Specifically, starting from an object-location representation corresponding to a location on the object, the remaining representations can be generated by shifting the activated cells based on the location shifts between object-locations. Although the activated cells in each module for a given object-location representation individually correspond to periodic locations in the object-centric space, the collection of the activated cells as a whole is sufficient to uniquely identify the object from other objects. In addition, the set of modules included in the architecture of the location processor 510 allows the inference system 104 to express a significantly large number of objects, even though the number of cells included in each module is relatively small.

The location processor 510 generates location signals 530 based on the activation of cells in the set of modules. In one embodiment, the location signals 530 indicate which cells are activated in the form of a concatenated vector. For example, the activation of each cell may be represented as a binary value, with the bit indicating whether the cell was active or inactive. The concatenated vector may be sent as location signals 530 of the location processor 510 to a corresponding set of modules of the location processor 510.

The output generator 1124 is a software, hardware, or a combination thereof that monitors activation states for each set of modules in the location processor, and generates inference output data 130 indicating identification of an unknown object and/or the location on the object during inference. Specifically, the output generator 1124 may continuously compare the set of candidate object-location representations to known object-location representations and generate the inference output data 130 if, for example, the set of candidate representations corresponds to a single known representation.

Figure 12:
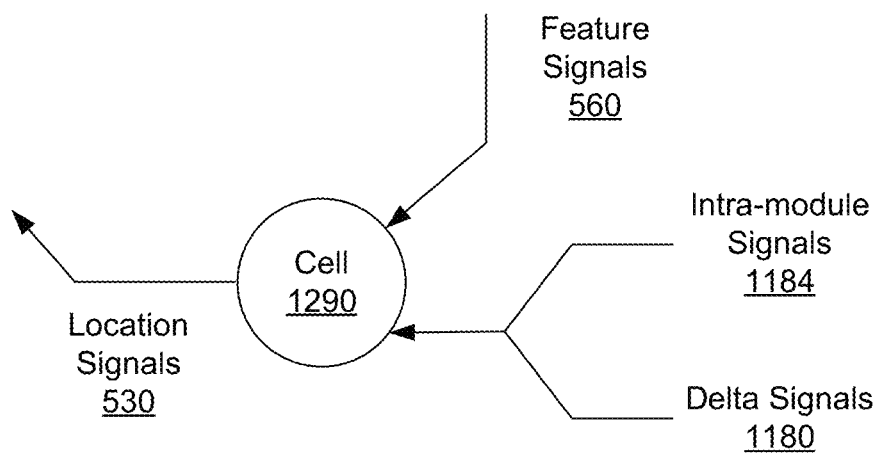
FIG. 12 is a conceptual diagram illustrating signals associated with a cell in the location processor, according to one embodiment.

FIG. 12 is a conceptual diagram illustrating signals associated with a cell 1290 in the location processor 510, according to one embodiment. As discussed in reference to FIG. 11, cell 1290 receives feature signal 560 indicating activation of a feature-location representation associated with the cell 890. Cell 1290 also receives intra-module signals 1184 from other cells in the same module of cell 1290, and delta signals 1180 indicating the location shift generated from movement of the sensor. In one embodiment, cell 1290 is activated when (i) cell 1290 receives a feature signal 560 from a cell in the input processor 512 having feature connections to the cell 1290, and/or (ii) cell 1290 receives both an intra-module signal 1184 from an active cell in the same module, and a delta signal 1180 that indicates a location shift from the active cell to cell 1290.
Example Operation and Function of Cells in Location Processor FIGS. 13A through 13D are diagrams illustrating example activation states of cells in the location processor 510 associated with learning and recognizing different objects including object A and object B, according to one embodiment. Specifically, FIGS. 13A through 13D show cells in a set M_A of modules A1, A2, . . . , An corresponding to sensor A in FIG. 11. Each circle represents a cell in a corresponding module. When each cell becomes active, the cell sends out location signals 530. For sake of simplicity, FIGS. 13A through 13D show an example inference process for a set M_A of modules for a single sensor.

Figure 13A:
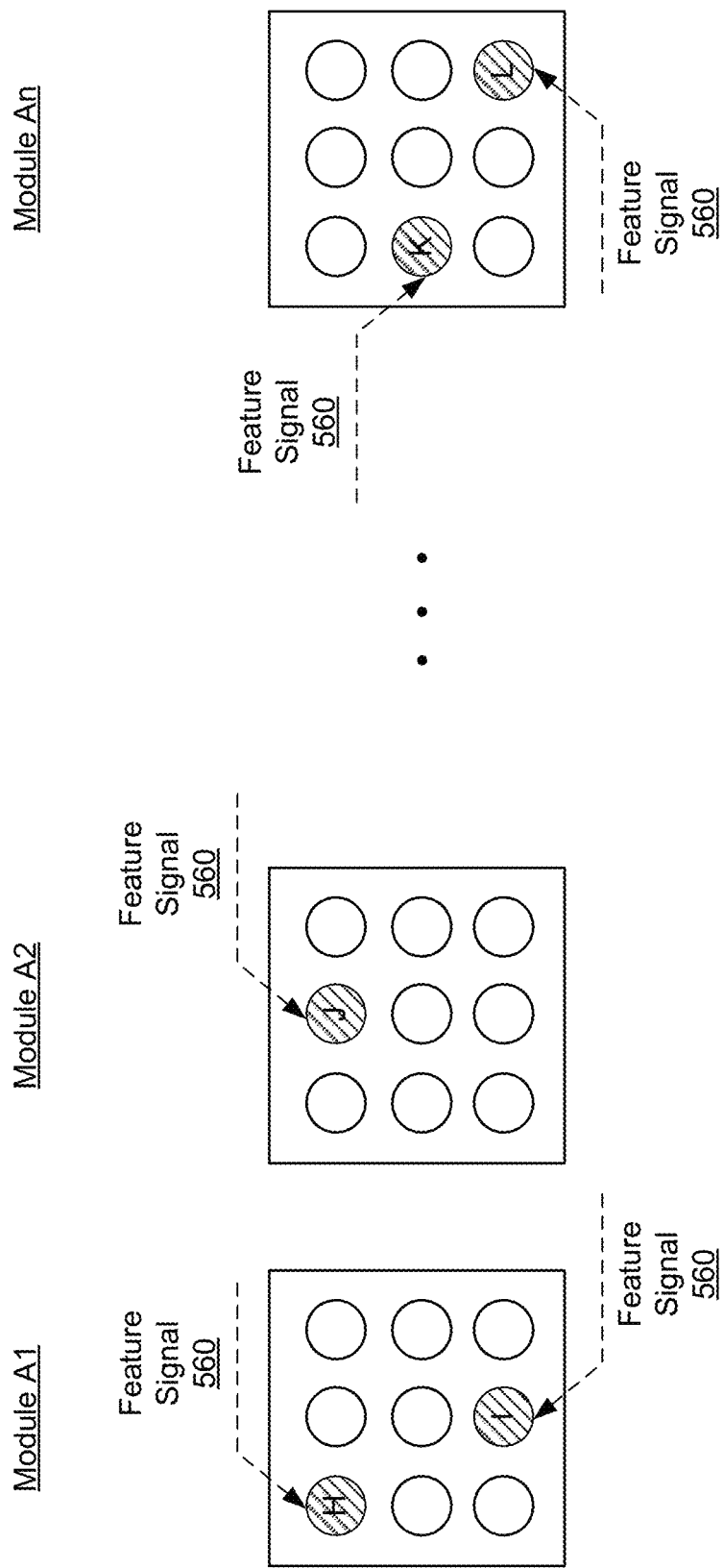

FIG. 13A illustrates the set M_A of modules receiving feature signals 560 indicating activated cells in the input processor 512. As illustrated in FIG. 13A, cells H, I, J, K, L are connected to the activated cells via feature connections, and hence, receive the feature signals 560 from the cells in the input processor 512. The feature signals 560 place the cells in an active state. The activated cells may represent a set of candidate object-location representations corresponding to {object A, $f_3$}, {object A, $f_1$}, and {object A, $f_2$}.

Figure 13B:
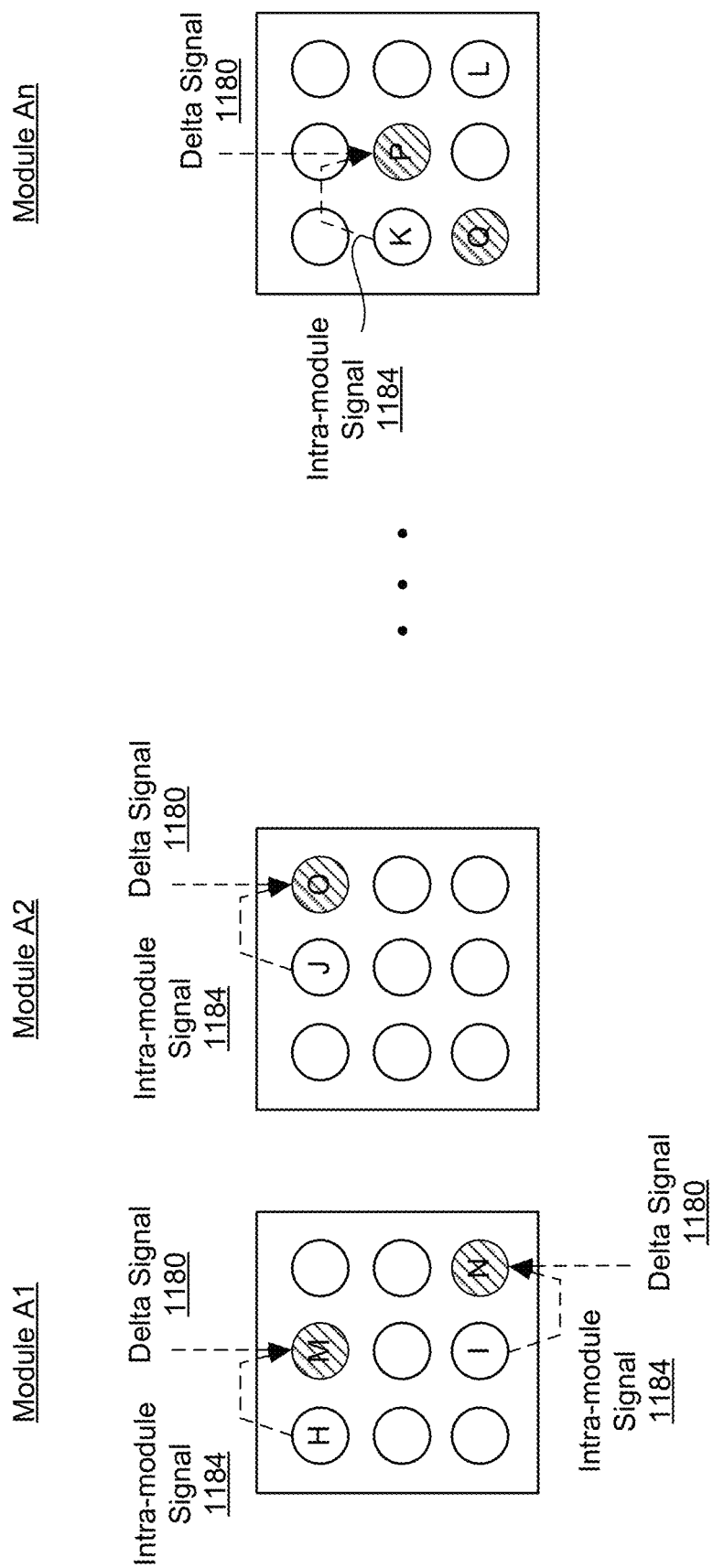

FIG. 13B illustrates updating the set of activated cells in the location processor 510 at a subsequent time step. The sensor is moved to a new location on the object, and the set of activated cells in the set M_A of modules are updated based on the determined location shift generated by movement of the sensor to the new location. As illustrated in FIG. 13B, cell M receives intra-module signal 1184 from previously activated cell H and delta signal 1180 indicating that a location shift from cell H to cell M has occurred due to movement of the sensor. Similarly, cell N receives intra-module signal 1184 from previously activated cell I and a corresponding delta signal 1180, and cell O receives intra-module signal 1184 from previously activated cell J and a corresponding delta signal 1180, cell P receives intra-module signal 1184 from previously activated cell K and a corresponding delta signal 1180, and cell Q receives intra-module signal 1184 from previously activated cell L and a corresponding delta signal 1180. The cells H, I, J, K, L are then turned into an inactive state.

As shown in FIG. 13C, the updated set of activated cells M, N, O, Q, P in the location processor 510 provide location signals 530 to cells in the input processor 512 having location connections with the activated cells. The location signals 530 place the corresponding cells in the input processor 512 in a predictive state. The input processor 512 receives new sensory input data 110. Based on the new sensory input data 110, a subset of the predictive cells in the input processor 512 are activated. For example, the subset of the predictive cells that receive column activation signals 734 may be activated.

Figure 13D:
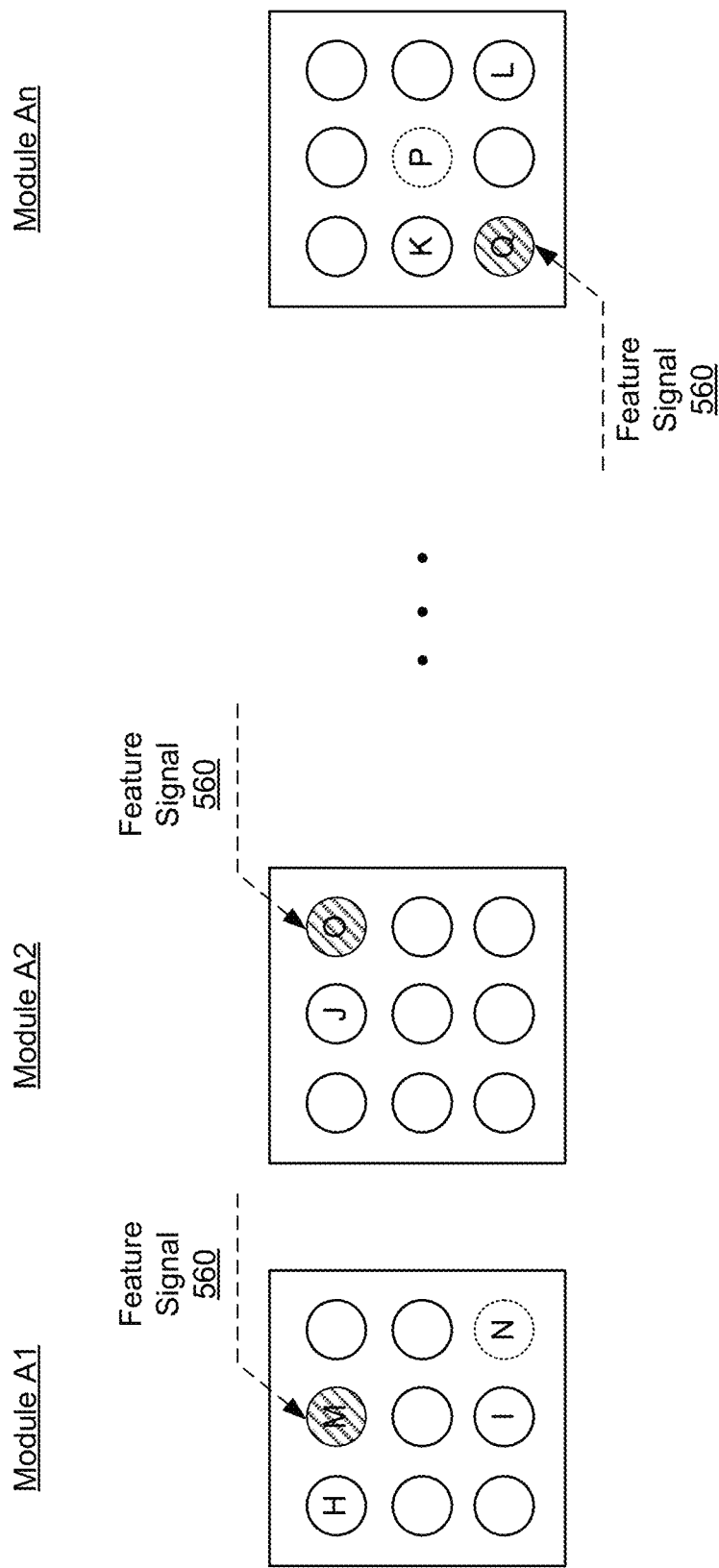

As shown in FIG. 13D, the set of activated cells of the input processor 512 provide activation states as feature signals 560 to the set M_A of modules for the location processor 510. Cells M, 0, Q receive feature signal 560 and remain in an active state. Cells N and P do not receive feature signal 560 and are placed in an active state. Since the resulting candidate object-location representation including activated cells M, 0, and Q correspond to a single representation (e.g., object A), the inference output data 130 indicates that the detected object is object A.

By using the inference system 104 described in conjunction with FIGS. 5 through 13, the inference process on an unknown object can be performed using a relatively small amount of cells and connections that result in a reduction of necessary computational resources. Specifically, although the set of modules for a sensor individually include a small set of cells and connections, the set of modules as a whole allows the inference system 104 perform inference on a significantly larger range of space without exponentially increasing the number of necessary connections between cells. Moreover, the learning process for new objects and environments can easily be performed as object-location representations for multiple locations on a new object can simply be generated from the relative movement of sensors from the previous location to the current location.

By using location representations that are specific to objects, the inference system 104 can be advantageous over other systems that represent locations and objects in two separate cell populations, because the inference system 104 can unambiguously represent a union of object-locations. Conversely, when activating a union of multiple locations on multiple objects, a system that uses two separate cell populations to represent non-object-specific locations and objects, respectively, may be unable to specify which locations correspond to which objects, and can prevent the system from succeeding at inference, or can make inference slower.

Architecture of Inference System with Common Reference Point

Figure 14:
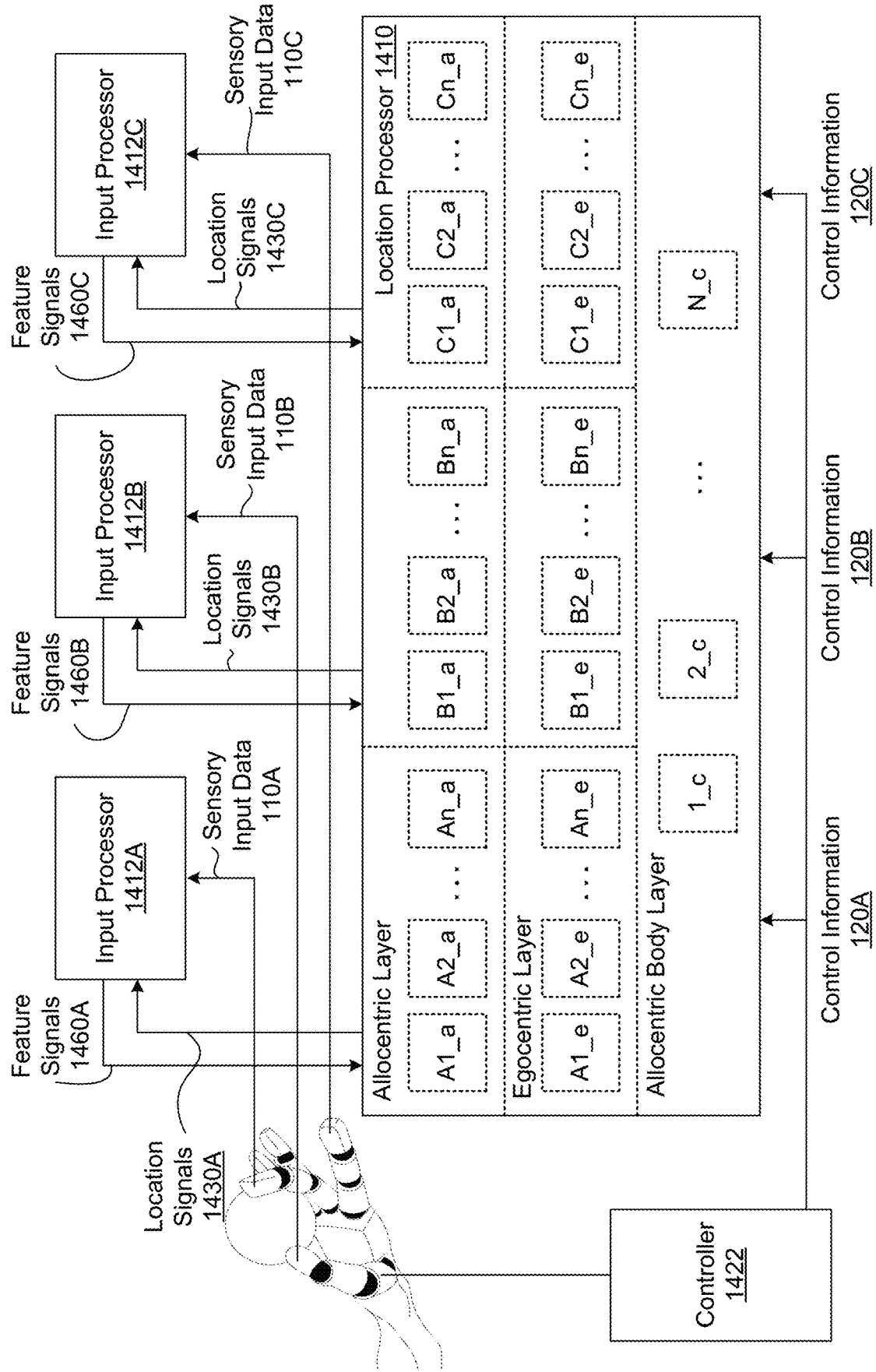
FIG. 14 is a detailed block diagram illustrating an inference system, according to another embodiment.

FIG. 14 is a detailed block diagram illustrating an inference system 104, according to another embodiment. In addition to the functionalities performed by the inference system 104 shown in FIG. 5, the inference system 104 shown in FIG. 14 performs an operation to further narrow down the set of candidate object-location representations in the location processor using information across multiple sensors. Specifically, the operation narrows down the set of activated cells to only those that are consistent with location estimates of an anchored reference point associated with the system of sensors. The reference point may be any point common across the system of sensors. For example, for a set of tactile sensors on a robotic hand, the reference point may be a location within the body of the robot that is common to the tactile sensors. This process may allow the inference system 104 to identify objects during inference using multiple sensors without further movement of the sensors if the combination of detected sensory features across the sensors are sufficient to distinguish the object.

Specifically, the inference system 104 uses the relationships between the egocentric locations of the sensors, the allocentric object-locations sensed by the sensors, and the allocentric body-location of the reference point to perform the narrowing process. The allocentric object-location is the characterization of a location relative to an object in an object-centric space. The egocentric locations are locations of the sensors relative to the reference point in a system-centric space centered around, for example, the reference point. The allocentric body-location is a unique characterization of the location of the reference point in the same object-centric space used to represent the allocentric object-locations. The egocentric locations and the allocentric body-location may also be represented as a subset of activated cells. The relationship between the allocentric object-locations and the allocentric body-location are determined by the corresponding egocentric locations of the sensors. Thus, within a triplet of an object-location representation, an egocentric representation, and a body-location representation, the representation for one location can be determined based on the representations for the other two locations.

During the inference process, given a set of candidate object-location representations for a system of sensors, the inference system 104 receives egocentric locations of each of the sensors from control information 120 provided by one or more controllers that control the sensors. For each sensor, the inference system 104 generates a set of estimated body-location representations based on the set of candidate object-location representations and the egocentric location of the sensor. The inference system 104 compares the set of estimated body-location representations across multiple sensors, and identifies a subset that are consistent across the system of sensors. The set of candidate object-location representations are narrowed down to only those that are associated with the identified subset of estimated body-location representations.

Subsequently, the inference system 104 may update the activation of candidate object-locations based on movement of the sensors, and narrow down the set of candidate object-locations responsive to detection of new sensory features at the new location relative to the object, similar to the steps described in conjunction with FIG. 6B. The inference system 104 may repeatedly alternate between narrowing down the set of candidate object-location representations through estimation of the common reference point between sensors and narrowing down the set of candidate object-location representations through detection of new sensory features at updated locations on the unknown object until a single representation remains.

The inference system 104 shown in FIG. 14 includes, among other components, a location processor 1410, input processors 1412A, 1412B, 1412C, and a controller 1422. Input processors 1412A, 1412B, 1412C are substantially similar to the input processors 512A, 512B, 512C described in conjunction with FIG. 5, and detailed description of the components and functionalities of the input processor 1412 will be omitted for the sake of brevity. Distinct from the location processor 510 shown in FIG. 5, the location processor 1410 shown in FIG. 14 is divided into an allocentric layer, an egocentric layer, and an allocentric body layer.

The allocentric layer includes a set of modules MA_a={A1_a, A2_a, . . . , An_a} associated with input processor 1412A, a set of modules MB_a={B1_a, B2_a, . . . , Bn_a} associated with input processor 1412B, and a set of modules MC_a={C1_a, C2_a, . . . , Cn_a} associated with input processor 1412C. The egocentric layer includes a set of modules MA_e={A1_e, A2_e, . . . , An_e} associated with input processor 1412A, a set of modules MB_e={B1_e, B2_e, . . . , Bn_e} associated with input processor 1412B, and a set of modules MC_e={C1_e, C2_e, . . . , Cn_e} associated with input processor 1412C. The allocentric body layer includes a set of modules M_c={1_c, 2_c, . . . , N_c}.

The allocentric layer of the location processor 1410 generates object-location representations. The allocentric layer of the location processor 1410 includes a set of modules that each include one or more cells. Similarly to the location processor 510, each sensor may be associated with a corresponding set of modules in the allocentric layer, in which each module represents a mapping of the object-centric space with a set of mapping characteristics. The set of modules of the allocentric layer may receive feature signals 1460 via feature connections to cells of the input processor 1412 that indicate activations of feature-location representations. The set of modules for the allocentric layer may also provide location signals 1430 to the corresponding input processor 1412 indicating activation states of cells.

The egocentric layer of the location processor 1410 represents the egocentric locations of sensors in a system-centric space. In one instance, the egocentric location of a sensor indicates the relative location of the sensor from a reference point. Similarly to the allocentric layer, each sensor may be associated with a corresponding set of modules in the egocentric layer that include one or more cells. The egocentric location may be represented by a subset of activated cells. Each module in the egocentric layer represents a mapping of the system-centric space with a set of mapping characteristics common to a corresponding module in the allocentric layer. For example, in the embodiment shown in FIG. 14, modules A1_e, A1_a, B1_e, B1_a, C1_e, and C1_a may have a common set of mapping characteristics.

The set of modules of the egocentric layer receive control information 120 that indicates the relative location of the corresponding sensor from the reference point. For example, the set of modules MA_e for sensor A may receive control information 120A indicating the egocentric location of sensor A relative to the location of the controller 1422 in the body of the robot. Similarly, the set of modules MB_e for sensor B may receive control information 12B indicating the egocentric location of sensor B, and the set of modules MC_e for sensor C may receive control information 120C indicating the egocentric location of sensor C. Each module in the egocentric layer encodes the egocentric location for the sensor with respect to the set of mapping characteristics for the module.

The allcentric body layer of the location processor 1410 generates body-location representations. The body-location representation indicates the location of the reference point in the object-centric space. The set of modules M_c of the allocentric body layer include one or more cells, and a body-location representation may be represented by a subset of activated cells. Given an object-location representation in the allocentric layer and an egocentric location encoded in the egocentric layer, a corresponding body-location representation in the allocentric body layer can be determined based on the relationships between the triplet location representations. Distinct from the allocentric layer and the egocentric layer, the set of modules M_c of the allocentric body layer are common across the system of sensors, in which each module represents the same object-centric space of one or more modules in the allocentric layer. For example, the object-centric space represented by module 1_c may coincide with that of modules A1_a, B1_a, and C1_a, and the object-centric space represented by module 2_c with a different set of mapping characteristics from module 1_c may coincide with that of modules A2_a, B2_a, and C2_a.

Although not shown in FIG. 14 for the sake of brevity, the location processor 1410 may also provide inference output data 130 for each set of modules in the allocentric layer, similarly to the location processor 510 described in conjunction with FIG. 5.

The controller 1422 includes substantially similar components to the controller 522 described in conjunction with FIG. 5, and description of the same will be omitted for the sake of brevity.

Learning of Connections for Inference with Common Reference Point

Figure 15A:
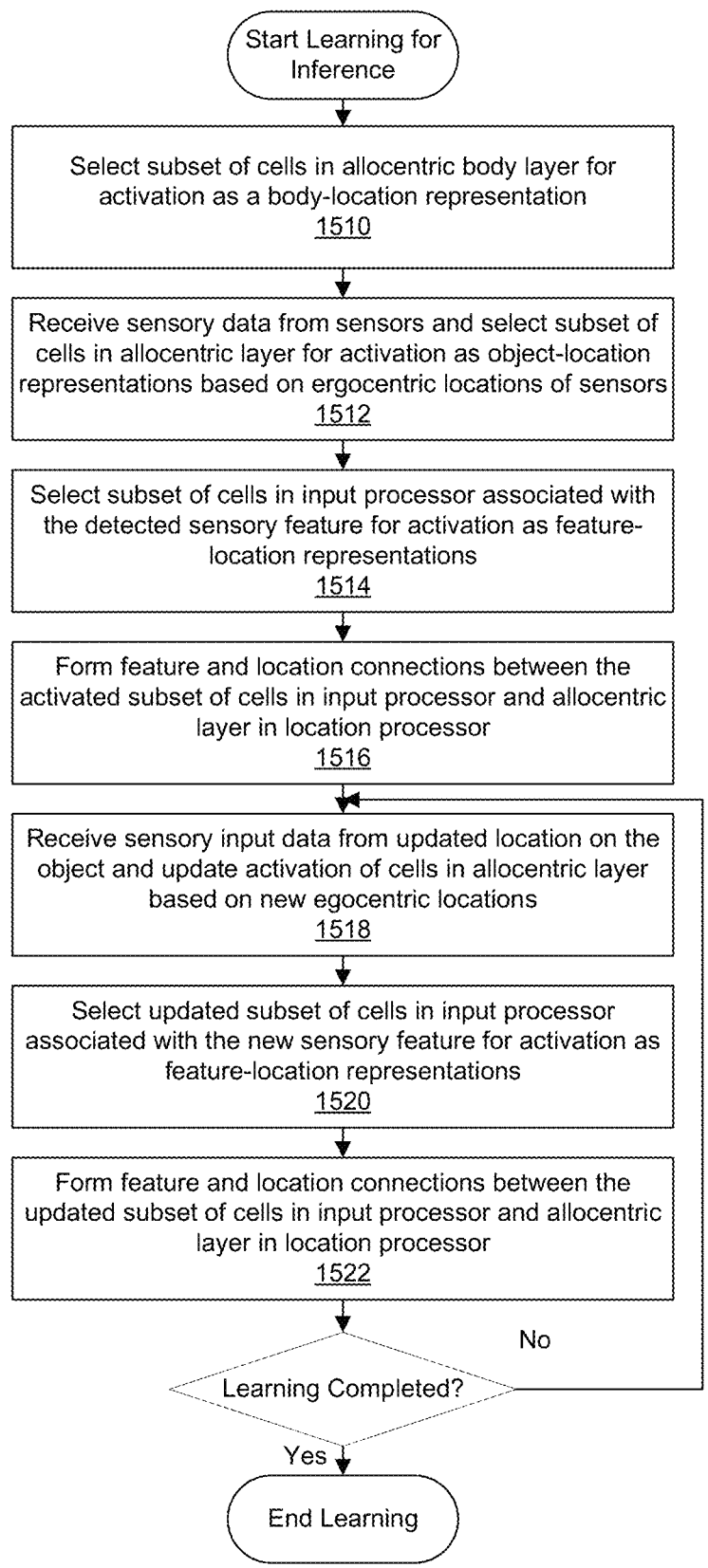
FIG. 15A is a flowchart illustrating a method of learning connections between cells of the input processors and the location processor, according to one embodiment.

FIG. 15A is a flowchart illustrating a method of learning connections between cells of the input processors 1412 and the location processor 1410, according to one embodiment. The steps shown in FIG. 15A are merely illustrative. One or more of these steps may be used in conjunction, selective selected or discarded, and/or varied during operation of the learning process. For example, one or more of these steps may be performed in a parallel operations and not in a particular sequence.

In particular, the process shown in FIG. 15A may be executed for cells in the location processor 1410 and the input processors 1412 for a system of sensors. The inference system 104 learns connections for an unknown object by selecting a subset of cells in the modules of the allocentric body layer for activation as a body-location representation. The inference system 104 selects a subset of cells in the allocentric layer for activation as the object-location representation. The subset of activated cells in the allocentric layer are determined based on the body-location representation and the egocentric locations of the sensors. The inference system 104 forms feature and location connections between the subset of activated cells in the allocentric layer to a subset of selected cells in the input processors 1412 that are associated with the detected feature. The activated cells in the allocentric layer are shifted based on movement of the sensors, and new connections are formed based on the new sensory inputs 110 at the updated location on the object.

Specifically, the system of sensors are initially positioned on a location on the object. The inference system 104 selects 1510 a subset of cells in the allocentric body layer for activation as a body-location representation. The inference system 104 receives 1512 sensory input data 110 from the location on the object, and selects a subset of cells in the allocentric layer for activation as the object-location representation. The selected object-location representation is determined based on the body-location representation and the egocentric locations of each sensor. Based on the sensory input data 110 at the location on the object, the inference system 104 selects 1514 a subset of cells in the input processors 1412 that are associated with the detected sensory feature 110 for activation as the feature-location representation. For example, the inference system 104 may elect a random cell in each column associated with the sensory feature for activation. A set of feature connections and location connections are formed 1516 between the activated subset of cells in the allocentric layer of the location processor 1410 and the input processor 1412.

The system of sensors move to a new location on the object. The inference system 104 receives 616 new sensory input data 110 at the updated location on the object. The inference system 104 updates the subset of activated cells in the allocentric layer of the location processor 1410 to a new object-location representation based on the updated egocentric locations of the sensors. Based on the new sensory input data 110 at the location on the object, the inference system 104 selects 1520 a subset of cells in the input processors 1412 that are associated with the new sensory feature for activation as the feature-location representation. Another set of feature connections and location connections are formed 1522 between the updated subset of cells in the input processor 1412 and the allocentric layer of the location processor 1410.

The learning process is completed for the particular object when, for example, each sensor has sensed sensory features on a set of allocentric locations on the object. When a new object is learned, the cells in the location processor 1410 and the input processors 1412 are deactivated, and the process described above is repeated for the new object.

Performing Inference Using the Inference System with Common Reference Point

Figure 15B:
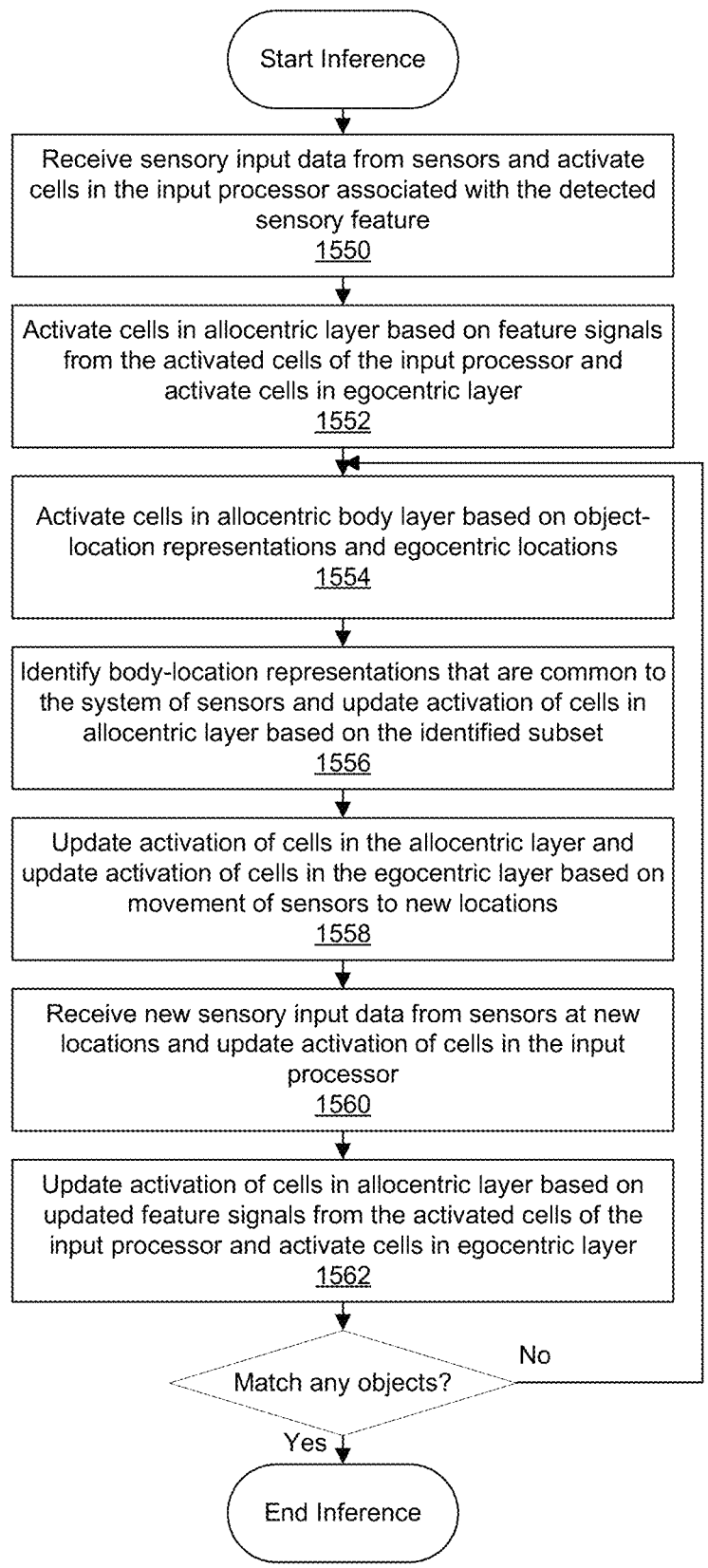
FIG. 15B is a flowchart illustrating a method of performing inference in the inference system, according to one embodiment.

FIG. 15B is a flowchart illustrating a method of performing inference in the inference system 104, according to one embodiment. The steps shown in FIG. 15B are merely illustrative. One or more of these steps may be used in conjunction, selective selected or discarded, and/or varied during operation of the learning process. For example, one or more of these steps may be performed in a parallel operations and not in a particular sequence.

The input processors 1412 receive 1550 sensory input data 110 for the system of sensors on unknown locations of an object, and activates cells associated with the detected feature described in the sensory input data 110. The input processor 512 provides the activation states of the cells as feature signals 1460 to cells in the allocentric layer of the location processor 1410 that have feature connections with the activated cells in the input processors 1412. The location processor 1410 activates 1552 cells in the allocentric layer based on the received feature signals 1460. A subset of cells in the egocentric layer are also activated based on the egocentric locations of the sensors indicated in control information 120.

For each sensor, the inference system 104 activates 1554 a subset of cells in the allocentric body layer of the location processor 1410 based on the set of activated object-location representations in the allocentric layer and the egocentric locations in the egocentric layer. The activated subset of cells represent an estimated set of body-location representations that are possible locations of the reference point in the object-centric space. The inference system 104 identifies 1556 a subset of body-location representations that are common to the system of sensors. The activation states of cells associated with the identified subset are maintained, while the remaining cells are placed in an inactive state. The inference system 104 updates activation states of cells in the allocentric layer to those that are associated with the identified subset of body-location representations.

The sensors are moved to new locations on the object, and the inference system updates 1558 the activation of cells in the allocentric layer and the cells in the egocentric layer based on the sensor movements. The location processor 1410 provides the activation states of the cells in the allocentric layer as location signals 1430 to cells in the input processors 1412 that have location connections with the activated cells in the allocentric layer. The input processors 1412 receive 1560 new sensory input data 110 for the sensors on the new locations, and updates activation of cells in the input processors 1412. Specifically, the input processors 1412 activate cells that are associated with the detected sensory feature and receive location signals 1430 from the current set of object-location representations in the allocentric layer. The input processor 1412 provides the activation states of cells to the allocentric layer, and the location processor 1410 updates 1562 the activation of cells to a subset of those that receive feature signals 1460 from the input processors 1412 through feature connections.

The inference process is completed for the particular object when, for example, the candidate object-location representations correspond to a single object. When a new object is to be inferred, the cells in the location processor 1410 and the input processors 1412 are deactivated, and the process described above is repeated for the new object.

Example Architecture of Location Processor with Triplet Layers

Figure 16:
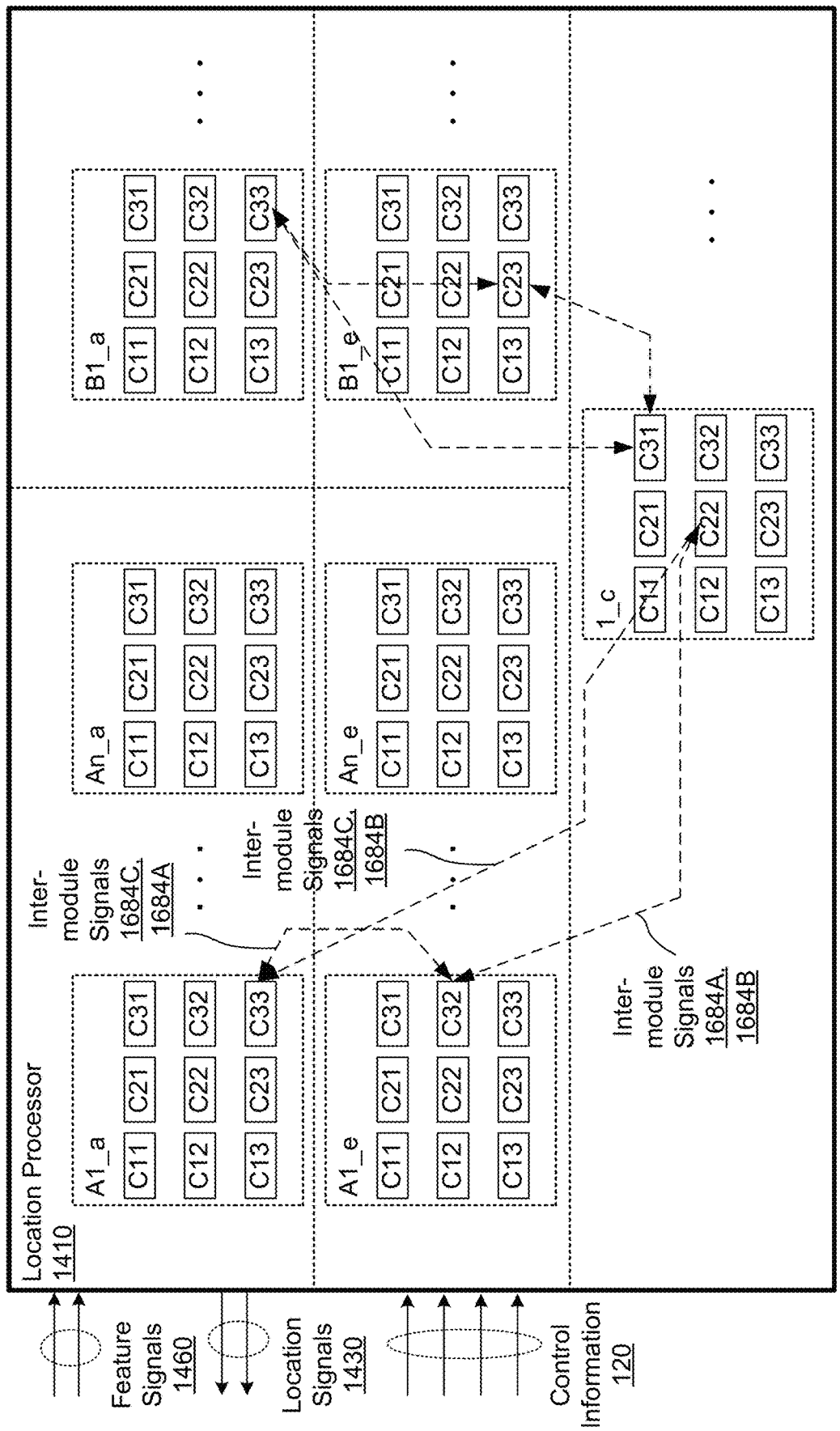
FIG. 16 is a detailed block diagram illustrating a location processor, according to another embodiment.

FIG. 16 is a detailed block diagram illustrating a location processor 1410, according to another embodiment. Location processor 1410 may include, among other components, a set of n modules per sensor in an allocentric layer, a set of n modules per sensor in an egocentric layer, and a set of n modules in an allocentric body layer that are common to all sensors. Specifically, the location processor 1410 shown in FIG. 16 includes a detailed view of the set of modules shown in FIG. 14. Each module in FIG. 16 includes a set of cells C11 through C33. Similarly to FIG. 11, the cells in FIG. 16 are arranged according to their relative locations to one another in the space represented by the module for ease of description.

In one embodiment, each module includes the same number of cells. In another embodiment, each module that corresponds to the same set of mapping characteristics includes the same number of cells. For example, in the location processor 1410 shown in FIG. 16, modules A1_a, A1_e, 1_c that use the same mapping characteristics may have the same number of cells, modules A2_a, A2_e, 2_c may have the same number of cells, and so on.

Similarly to the location processor 510 described in conjunction with FIG. 5, the set of modules in the allocentric layer receive feature signals 1460 from the input processors 512, and provide information on activation states of the cells as location signals 1430 to the input processors 512. As described in conjunction with FIG. 11, each cell in a module of the allocentric layer may represent periodic locations in the object-centric space that arise when the cells of the module are tiled alongside each other to represent the larger object-centric space. In one instance, the cells in the allocentric layer may become active responsive to receiving feature signals 1460 indicating activation of feature-location representations associated with the cells. In another instance, the cells in the allocentric layer may become active if the currently active set of egocentric representations and body-location representations result in activation of the object-location representation associated with the cells to satisfy the relationship for a triplet.

Although not shown in FIG. 16, the allocentric layer of the location processor 1410 may also include an output generator similar to the output generator 1124 described in conjunction with FIG. 11, that monitors activation states of cells in the allocentric layer and generates inference output data 130 indicating the results of inference.

The set of modules in the egocentric layer receive control information 120 from the controller 1422 that indicates the egocentric location of the sensors relative to the reference point. The egocentric representation corresponds to a subset of activated cells in the set of modules of the egocentric layer. The cells in a module of the egocentric layer may also represent different locations in a tile space that can be, for example, significantly smaller than the size of the system-centric space around the sensors.

A cell in the egocentric layer may be inactive or active. In one instance, cells of the egocentric layer become active if the currently active set of object-location representations and body-location representations result in activation of the egocentric representation associated with the cells to satisfy the relationship for a triplet. In another instance, cells of the egocentric layer become active responsive to receiving control information 120 from the controller 1422 that indicate the relative location of the sensor with respect to the reference point. Specifically, responsive to receiving control information 120, location processor 1410 may activate the appropriate cells in the egocentric layer by transforming the egocentric location with respect to the mapping characteristics of the modules. For example, responsive to receiving control information 120 that sensor A is 10 cm above the reference point, cell C21 in module A1_e may be activated based on the mapping characteristics of module A1_e, while cell C22 in module An_e may be active based on the different mapping characteristics of module An_e.

Cells in the egocentric layer may also be re-used for activation as control information 120 indicates that the relative locations of the sensor are beyond the range of the tile space. In other words, the system-centric space may be represented by tiling the cells of the module alongside each other in a repeated manner. For example, responsive to control information 120 indicating that the sensor is 20 cm above the reference point, the activation states of cells in module A1_e may shift from cell C21 to cell C23, since there are no other cells past cell C21 within a given tile space, and cell C23 is the next cell upwards if another set of cells were placed above the current set of cells. Thus, each cell in a module of the egocentric layer may actually represent a series of periodic locations in the system-centric space that arise when the cells of the module are tiled alongside each other to represent the larger system-centric space.

The set of modules in the allocentric body layer generate body-location representations in the object-centric space represented by the modules of the allocentric layer. Only a single set of modules are present in the allocentric body layer, since the modules of the allocentric body layer are used to estimate the allocentric location of the reference point that should be consistent across all sensors of the system. The cells of the allocentric body layer may become active if the currently active set of egocentric representations and allocentric object-location representations result in activation of the body-location representation associated with the cells to satisfy the conditions for a triplet.

In one embodiment, cells in different layers of the location processor 1410 are connected to each other through inter-module connections 1684. An activated cell in a module can provide inter-module signals 1684 to cells in modules of other layers via the inter-module connections to indicate activation of the cell. The inter-module connections are configured such that a cell representing a location in one layer is activated responsive to receiving inter-module signals 1684 from a pair of cells in the remaining two layers that altogether satisfy the relationship conditions for a triplet. In one instance, the inter-module connections 1684 are generated exclusively between cells in modules that share the same mapping characteristics. For example, as shown in FIG. 16, one set of inter-module signals 1684 are exclusively generated between modules A1_a, A1_e, 1_c, B1_a, and B1_e that all share the same mapping characteristics with each other. Another set of inter-module signals 1684 may be exclusively generated between modules A2_a, A2_e, 2_c, B2_a, and B2_e, and so on.

Specifically, the inter-module signals 1684 include inter-module signals 1684A that are generated by active cells in the egocentric layer, inter-module signals 1684B that are generated by active cells in the allocentric body layer, and inter-module signals 1684C that are generated by active cells in the allocentric layer. For example, cell C33 in module A1_a output inter-module signal 1684C to cell C32 in module A1_e, while cell C32 in module A1_e output inter-module signal 1684A to cell C33 in module A1_a.

In one instance, a cell in an allocentric layer may be activated responsive to receiving inter-module signals 1684A, 1684B from cells in the egocentric layer and the allocentric body layer if the addition of the pair of cells results in the location represented by the cell in the allocentric layer. In another instance, a cell in an allocentric layer may be activated responsive to receiving inter-module signals 1684B, 1684A from cells in the allocentric body layer and the egocentric layer if the subtraction of the location represented by the cell in the egocentric layer from the location represented by the cell in the allocentric body layer results in the location represented by the cell in the allocentric layer.

Example Diagram of Cell in Location Processor with Common Reference Point

Figure 17A:
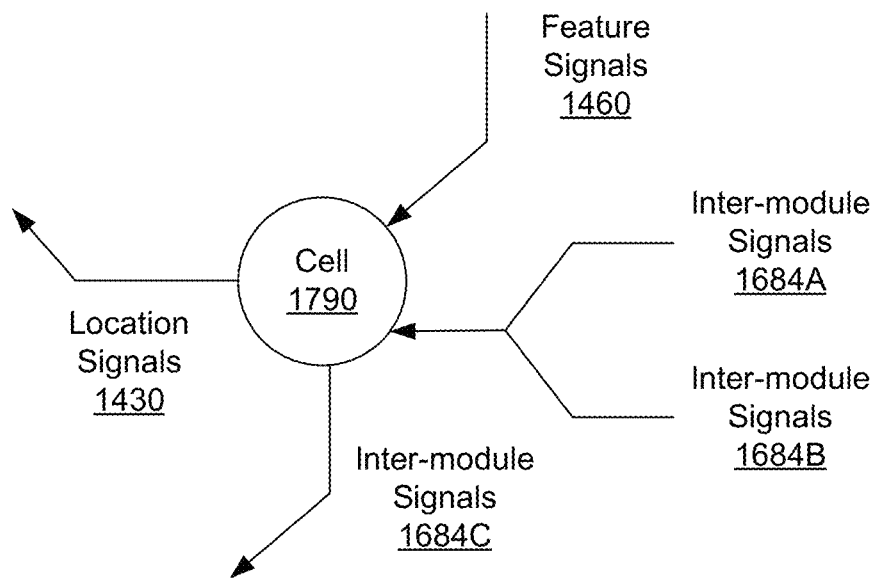
FIG. 17A is a conceptual diagram illustrating signals associated with a cell in an allocentric layer of the location processor, according to one embodiment.

FIG. 17A is a conceptual diagram illustrating signals associated with a cell 1790 in an allocentric layer of the location processor 1410, according to one embodiment. As discussed in reference to FIG. 16, cell 1790 receives feature signal 1460 indicating activation of a feature-location representation associated with the cell 1790. Cell 1790 also receives inter-module signal 1684A from a cell in an egocentric layer and inter-module signal 1684B from a cell in an allocentric body layer. In one embodiment, cell 1790 is activated when (i) cell 1790 receives a feature signal 1460 from a cell in the input processor 1412 having feature connections to the cell 1790, and/or (ii) cell 1790 receives both an inter-module signal 1684A from an active cell in the egocentric layer and an inter-module signal 1684B from an active cell in the allocentric body layer that satisfies the condition for a triplet with the cell 1790. The cell 1790 also provides its activation state as location signals 1430 to cells in the input processor 512 having location connections with the cell 1790, and as inter-module signal 1684C to cells in the remaining two layers.

Figure 17B:
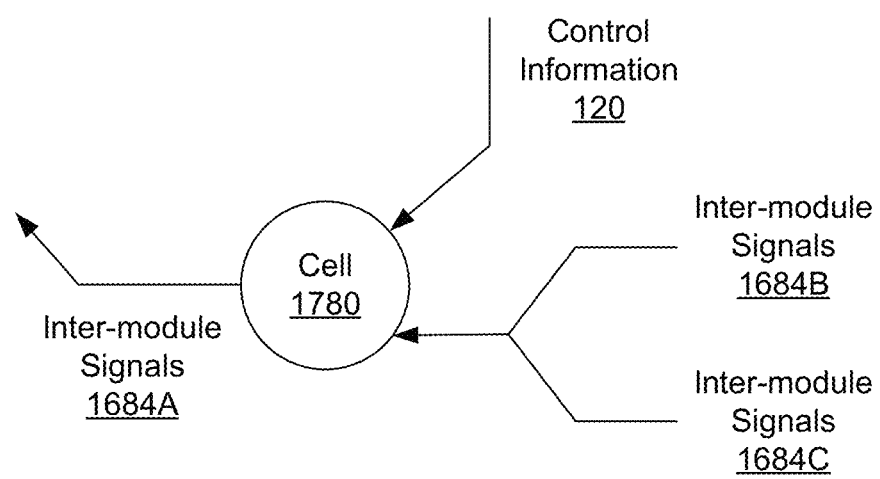
FIG. 17B is a conceptual diagram illustrating signals associated with a cell in an egocentric layer of the location processor, according to one embodiment.

FIG. 17B is a conceptual diagram illustrating signals associated with a cell 1780 in an egocentric layer of the location processor 1410, according to one embodiment. As discussed in reference to FIG. 16, cell 1780 receives control information 120 indicating the egocentric location of a corresponding sensor. Cell 1780 also receives inter-module signal 1684B from a cell in an allocentric body layer and inter-module signal 1684C from a cell in an allocentric layer. In one embodiment, cell 1780 is activated when (i) cell 1780 receives control information 120 indicating that the sensor is at an egocentric location represented by the cell 1780, and/or (ii) cell 1780 receives both an inter-module signal 1684B from an active cell in the allocentric body layer and an inter-module signal 1684C from an active cell in the allocentric layer that satisfies the condition for a triplet with the cell 1780. The cell 1780 also provides its activation state as location signals inter-module signal 1684A to cells in the remaining two layers.

Figure 17C:
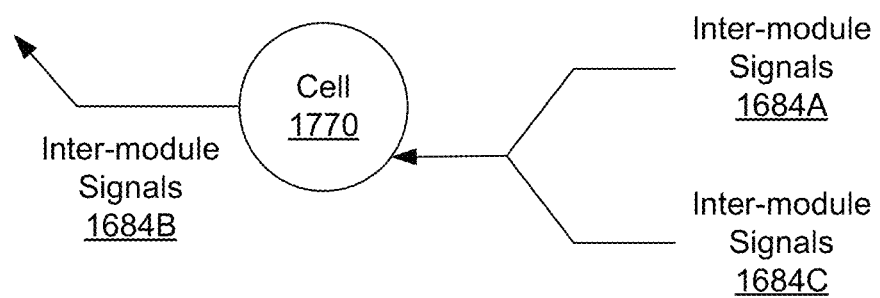
FIG. 17C is a conceptual diagram illustrating signals associated with a cell in an allocentric body layer of the location processor, according to one embodiment.

FIG. 17C is a conceptual diagram illustrating signals associated with a cell 1770 in an allocentric body layer of the location processor 1410, according to one embodiment. As discussed in reference to FIG. 16, cell 1770 receives inter-module signal 1684A from a cell in an egocentric layer and inter-module signal 1684C from a cell in an allocentric layer. In one embodiment, cell 1770 is activated when cell 1770 receives both an inter-module signal 1684A from an active cell in the egocentric layer and an inter-module signal 1684C from an active cell in the allocentric layer that satisfies the condition for a triplet with the cell 1770. The cell 1770 also provides its activation state as inter-module signal 1684B to cells in the remaining two layers.

Figure 18A:
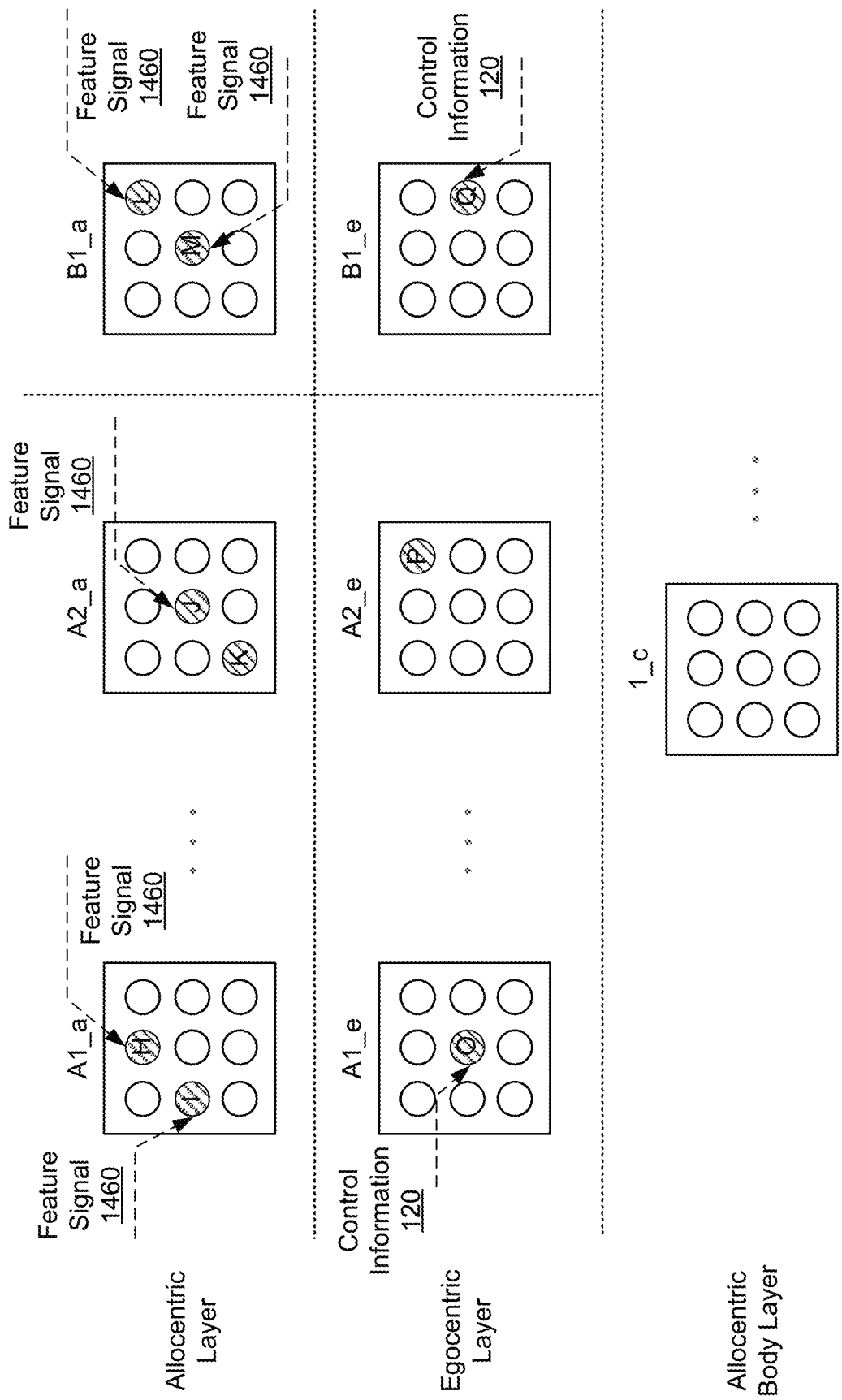
FIGS. 18A through 18C are diagrams illustrating example activation states of cells in the location processor associated with learning and recognizing different objects, according to one embodiment.
Figure 18B:
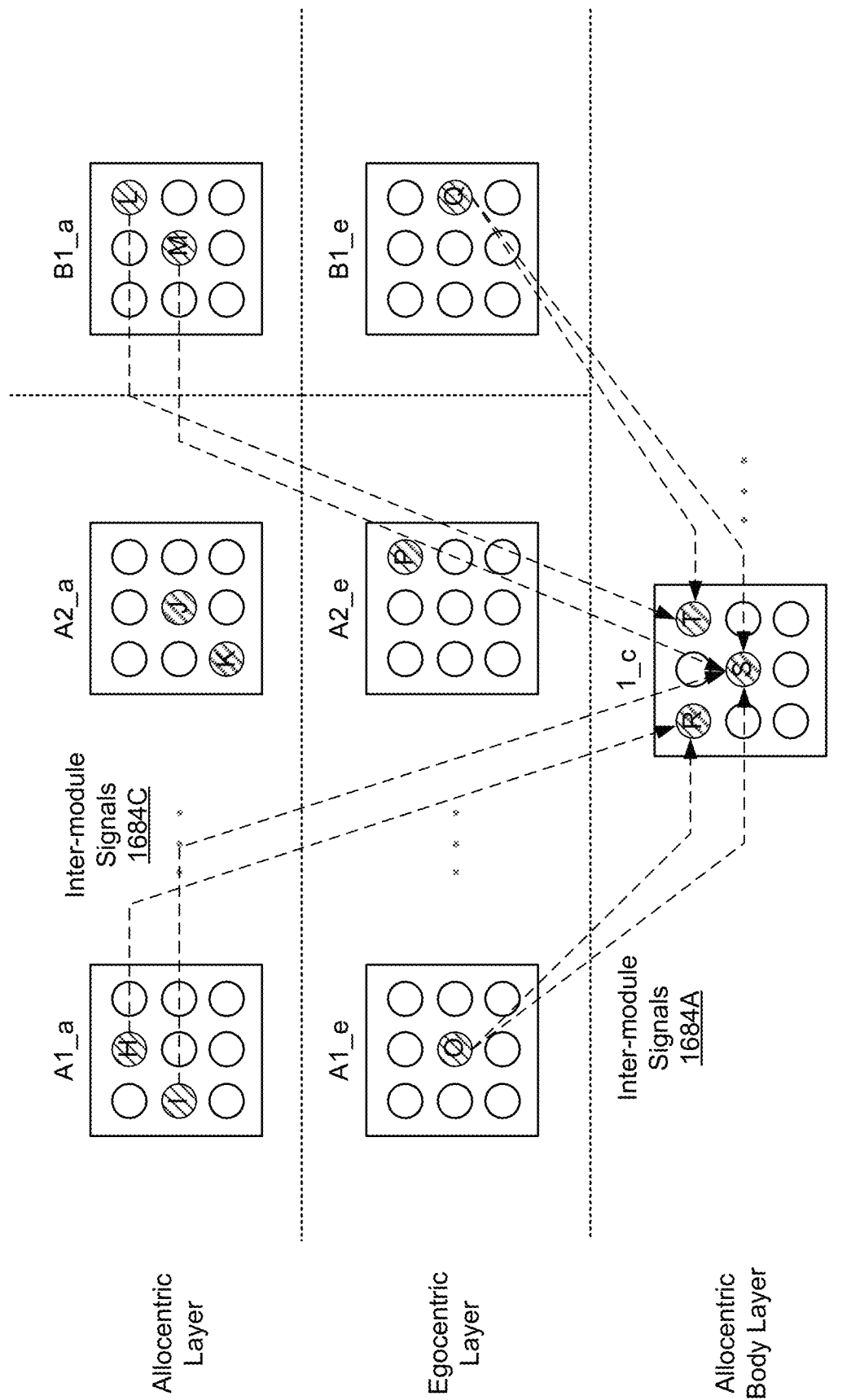
Figure 18C:
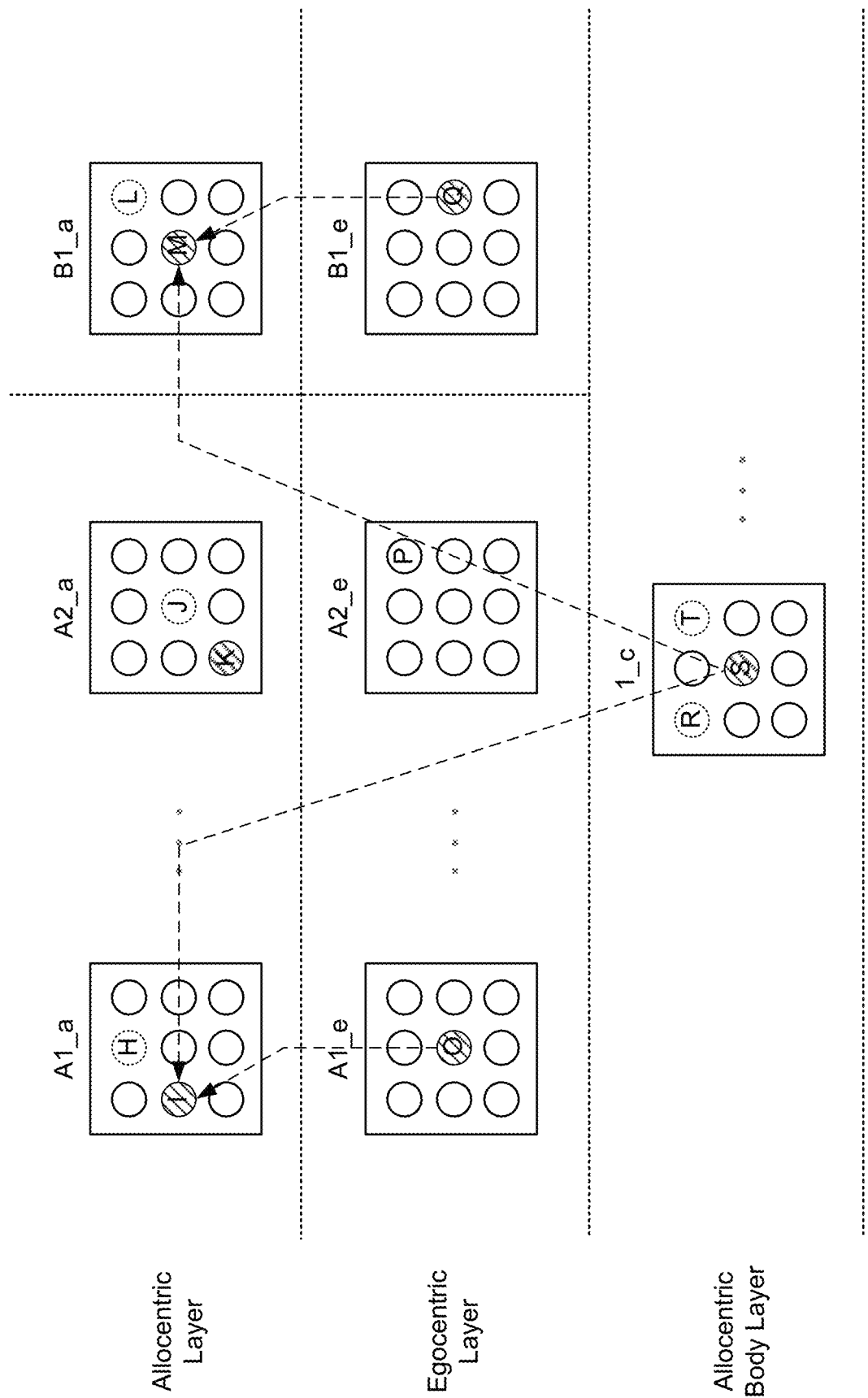

Example Operation and Function of Cells in Location Processor with Common Reference Point FIGS. 18A through 18C are diagrams illustrating example activation states of cells in the location processor 1410 associated with learning and recognizing different objects including object A and object B, according to one embodiment. Specifically, FIGS. 18A through 18C show cells in a set of modules MA_a and MB_a in an allocentric layer, a set of modules MA_e and MB_e in an egocentric layer, and a set of modules M_c of an allocentric body layer. Each circle represents a cell in a corresponding module. When each cell becomes active, the activated cell in the allocentric layer sends out location signals 1430 and inter-module signals 1684C. The activated cell in the egocentric layer sends out inter-module signals 1684A. The activated cell in the allocentric body layer sends out inter-module signals 1684B.

FIG. 18A illustrates the set of modules in the allocentric layer receiving feature signals 1460 indicating activated cells in the input processors 1412. As illustrated in FIG. 18A, cells H, I, J, K, L, M are connected to the activated cells via feature connections, and hence, receive the feature signals 1460 from the cells in the input processors 1412. The feature signals 1460 place the cells in an active state. The activated cells may represent a set of candidate object-location representations. FIG. 18A also illustrates the set of modules in the egocentric layer receiving control information 120. As illustrated in FIG. 18A, cells O, P, Q receive control information 120 indicating that corresponding sensors are at egocentric locations represented by the cells, and hence, are placed in an active state.

FIG. 18B illustrates activating cells in the allocentric body layer. Active cells H, I, J, K, L, M send inter-module signals 1684C to cells in the egocentric layer and the allocentric body layer. Activated cells O, P, Q send inter-module signals 1684A to cells in the allocentric layer and the allocentric body layer. Responsive to receiving the inter-module signals 1684, cells R, S, T in the allocentric body layer are activated since they each receive a pair of inter-module signals from cells that satisfy conditions for a triplet with these cells. Specifically, cell R receives inter-module signals 1684 from cells H and 0, cell T receives inter-module signals 1684 from cells L and Q, and cell S receives inter-module signals from cells O and I associated with sensor A, and from cells M and Q associated with sensor B.

As illustrated in FIG. 18C, the location processor 1410 maintains activation of cell S in the allocentric body layer, but inhibits the activation of cells R and T, since cell S is the only cell that receives inter-module signals 1684 from both sensors, and is the only cell that is consistent with both sensors. Active cell S sends inter-module signals 1684B to cells in the allocentric layer and the egocentric layer. Consequently, cells I, K, M remain active because they each receive the pair of inter-module signals 1684 from cells that satisfy conditions for a triplet. The previously active cells H, J, L are inhibited and placed in an inactive state. Thus, due to the operation of estimating the common reference point, the initial set of candidate object-location representations including cells H, I, J, K, L, M are narrowed down to a set of representations including cells I, K, M.

Subsequently, the sensors are moved to new locations on the object, and the set of activated cells in the allocentric layer may be updated based on the movement of the sensors. The set of candidate object-location representations may be further narrowed down based on the newly detected sensory features, as described in conjunction with FIG. 15B.

Figure 19:
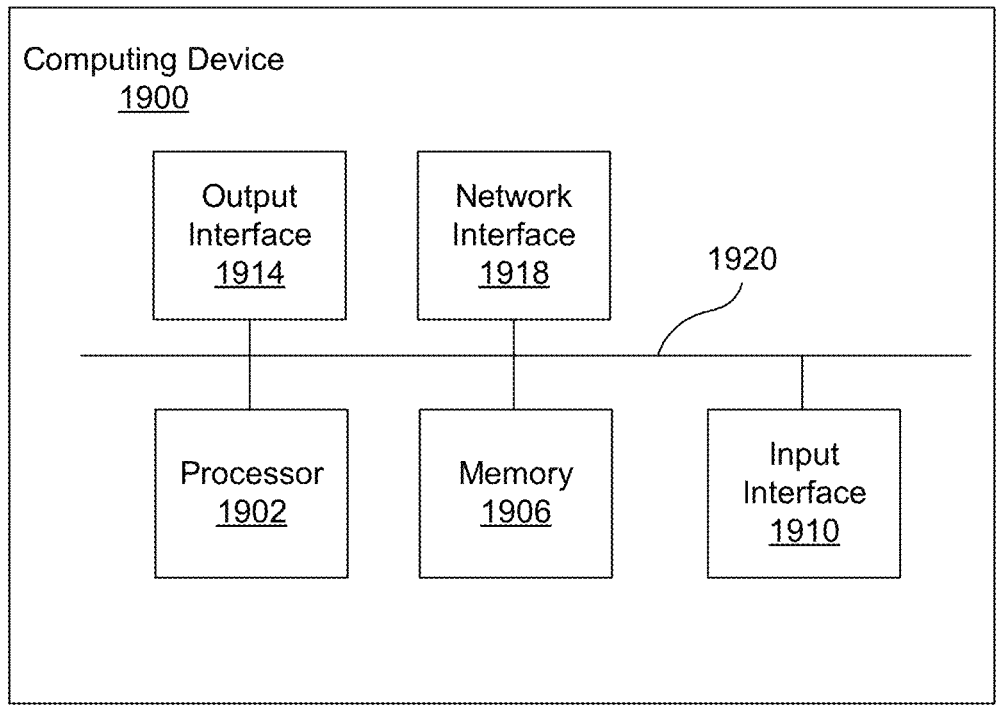
FIG. 19 is a block diagram of a computing device for implementing inference systems according to embodiments.

FIG. 19 is a block diagram of a computing device 1900 for implementing inference systems according to embodiments. The computing device 1900 may include, among other components, a processor 1902, a memory 1906, an input interface 1910, an output interface 1914, a network interface 1918, and a bus 1920 connecting these components. The processor 1902 retrieves and executes commands stored in memory 1906. The memory 1906 store software components including, for example, operating systems and modules for instantiating and executing nodes as described herein. The input interface 1910 receives data from external sources such as sensor data or action information. The output interface 1914 is a component for providing the result of computation in various forms (e.g., image or audio signals). The network interface 1918 enables the computing device 1900 to communicate with other computing devices by a network. When multiple nodes or components of a single node is embodied in multiple computing devices, information associated with temporal sequencing, spatial pooling and management of nodes may be communicated between computing devices via the network interface 1918.

By using the inference system 104 described in conjunction with FIGS. 14 through 18, the inference process on an unknown object can be performed faster compared to the inference system 104 of FIG. 5, as information from multiple sensors are shared to further narrow down the set of object-location representations. Specifically, the inference system 104 of FIG. 14 even allows identification of objects and locations on objects without further movement of sensors if the combination of detected features through a plurality of sensors are sufficient to identify the object.

Additionally, the inference system 104 can infer the egocentric location of a sensor. If the inference system 104 has inferred a sensor's allocentric location and the allocentric body-location, cells 1780 in the egocentric layer, as shown in FIG. 17B, receive input from appropriate active cells 1790 in the allocentric layer and active cells 1770 in the allocentric body layer to be placed in an active state. This situation can arise when a sensor's egocentric location is unknown or ambiguous, when this sensor receives sensory input, and when the inference system 104 has inferred the allocentric body location or a union of allocentric body locations through other means, e.g. via other sensors. This capability can be used to correct errors in the egocentric location of a sensor. If a plurality of sensors each have noisy or error-prone egocentric locations, this mechanism gives them a way to work together to correct each other's errors.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. A computer-implemented method of performing inference, comprising:
receiving, by a first input processor, first input data derived from a first feature of an object;
generating, by the first input processor, a first input representation indicating a combination of the first feature and first potential locations on the first candidates of the object associated with the first feature;
determining, by a location processor, a first candidate-location representation from the first input representation, the first candidate-location representation indicating the first candidates and the first potential locations on the first candidates, and wherein the first candidate-location representation is an activation state of a first subset of location cells in the location processor;
receiving, by the first input processor, second input data derived from a second feature of the same object, subsequent to receiving the first input data;
generating, by the first input processor, a second input representation indicating a combination of the second feature and second potential locations on second candidates of the object associated with the second feature, the second candidates being a subset of the first candidates;
determining, by the location processor, a second candidate-location representation from the second input representation, the second candidate-location representation indicating the second candidates and the second potential locations on the second candidates, and wherein the second candidate-location representation is an activation state of a second subset of the location cells in the location processor; and determining the object based at least on the second candidate-location representation.

2. The computer-implemented method of claim 1, further comprising generating, by the location processor, location signals representing a prediction on the second input representation based on the first candidate-location representation, wherein the second input representation is generated by the first input processor based further on the location signals.

3. The computer-implemented method of claim 2, wherein at least a subset of the second potential locations is separated from the first potential locations by a predetermined distance.

4. The computer-implemented method of claim 1, further comprising:
receiving, by the first input processor, training input data derived from the first feature on a particular location on the object;
generating, by the location processor, a candidate-location representation indicating the object and the particular location on the object;
generating, by the first input processor, a training input representation indicating a combination of the first feature and the particular location on the object associated with the first feature; and
associating the training input representation with the candidate-location representation.

5. The computer-implemented method of claim 4, wherein the training input representation is an activation state of a subset of input cells in the first input processor, and the candidate-location representation is an activation state of a subset of location cells in the location processor, and wherein associating the training input representation with the candidate-location representation comprises forming connections between the subset of location cells in the location processor and the subset of input cells in the first input processor.

6. The computer-implemented method of claim 1, wherein the first input representation is an activation state of a first subset of input cells in the first input processor provided to the location processor for generating the first candidate-location representation, and the second input representation is an activation state of a second subset of the input cells in the first input processor provided to the location processor for generating the second candidate-location representation.

7. The computer-implemented method of claim 6, wherein the first input representation indicates an activation of a union of pairs of the first feature and each of the first potential locations on the first candidates, and wherein the second input representation indicates an activation of a union of pairs of the second feature and each of the second potential locations on the second candidates.

8. The computer-implemented method of claim 6, wherein generating the second input representation comprises placing a subset of the input cells including the second subset of the input cells in a predictive state, and activating the second subset of the input cells in the first input processor responsive to the second subset of input cells receiving activation signals associated with the second feature.

9. The computer-implemented method of claim 1, further comprising generating, by the location processor, location signals indicating activation states of a third subset of the location cells generated by shifting the first subset of the location cells, wherein the location signals are provided to the first input processor for generating the second input representation.

10. The computer-implemented method of claim 9, wherein the location cells of the location processor are arranged into a plurality of modules, each module including a corresponding subset of the location cells that represent locations separated by an interval in a space surrounding the first candidates and the second candidates.

11. The computer-implemented method of claim 1, wherein the first input data and the second input data are generated by a sensor detecting properties of the object.

12. The computer-implemented method of claim 11, further comprising generating, by the location processor, a body-location representation corresponding to the sensor, the body-location representation indicating first estimated locations for a reference point associated with the sensor, wherein the first estimated set of locations for the reference point is generated based on the first locations on the first candidates.

13. The computer-implemented method of claim 12, further comprising receiving, by the location processor, control information indicating a location of the sensor relative to the reference point associated with the sensor, wherein the first body-location representation is generated further based on the control information.

14. The computer-implemented method of claim 1, further comprising:
receiving, by a second input processor, a third input data derived from a third feature by another sensor;
generating, by the second input processor, a third input representation indicating a combination of the third feature and third potential locations on third candidates of the object associated with the third feature; and
determining, by the location processor, a third candidate-location representation from the third input representation, the third candidate-location representation indicating the third candidates and the third potential locations on the third candidates.

15. The computer-implemented method of claim 14, further comprising generating a body-location representation indicating a union of estimated locations for a reference point with respect to the object, and wherein the second candidate-location representation is generated further based on the body-location representation.

16. The computer-implemented method of claim 15, wherein generating the body-location representation comprises:
generating, for the sensor, the estimated locations for the reference point with respect to the sensor based on the first candidate-location representation for the sensor;
generating, for the other sensor, the estimated locations for the reference point with respect to the other sensor based on the third candidate-location representation for the other sensor; and
determining the body-location representation as a union of at least the estimated locations for the reference point for the sensor and the other sensor.

17. A computer-implemented method of performing inference, comprising:
receiving, by a plurality of input processors, input data associated with features at different locations of an object;
generating, by the plurality of input processors, a plurality of input representations, each input representation indicating a combination of a feature and potential locations of the feature on candidates of the object;
determining, by a location processor, a plurality of first candidate-location representations, each first candidate-location representation indicating the candidates and the potential locations on the candidates associated with each of the input representations, wherein each of the first candidate-location representations is an activation state of a corresponding first subset of location cells in the location processor;

generating, by the location processor, a plurality of second candidate-location representations selected from the first candidate-location representations that are consistent with relative relationships between the different locations of the object, wherein each of the second candidate-location representations is an activation state of a corresponding second subset of the location cells in the location processor; and determining the object based at least on the plurality of second candidate-location representations.

18. The computer-implemented method of claim 17, wherein the input data is generated by a plurality of sensors to detect the features at the different locations.

19. The computer-implemented method of claim 18, wherein the input data is generated simultaneously by the plurality of sensors.

20. The computer-implemented method of claim 18, further comprising generating a body-location representation indicating a union of estimated locations for a reference point with respect to the object, the second candidate-location representations selected from the first candidate-location representations based at least on the body-location representation, the body location representation generated by:

generating, for each sensor, the estimated locations for the reference point with respect to each of the sensors based on a corresponding first candidate-location representation for each of the sensors; and determining the body-location representation as a union of the estimated locations for the reference point with respect to each of the sensors.

21. The computer-implemented method of claim 20, wherein generating each second candidate-location representation comprises selecting the candidates and the potential locations on the candidates that are associated with a subset of the estimated locations for the reference point that are consistent with the plurality of sensors.

22. A computing device, comprising:
a first input processor configured to:
receive first input data derived from a first feature of an object;
generate a first input representation indicating a combination of the first feature and first potential locations on the first candidates of the object associated with the first feature;
receive second input data derived from a second feature of the same object, subsequent to receiving the first input data;
generate a second input representation indicating a combination of the second feature and second potential locations on second candidates of the object associated with the second feature, the second candidates being a subset of the first candidates;

a location processor configured to:
determine a first candidate-location representation from the first input representation, the first candidate-location representation indicating the first candidates and the first potential locations on the first candidates, wherein the first candidate-location representation is an activation state of a first subset of location cells in the location processor;
determine a second candidate-location representation from the second input representation, the second candidate-location representation indicating the second candidates and the second potential locations on the second candidates, wherein the second candidate-location representation is an activation state of a second subset of the location cells in the location processor; and an output generator configured to:
determine the object based at least on the second candidate-location representation.

23. The computing device of claim 22, wherein the location process is further configured to:
generate location signals representing a prediction on the second input representation based on the first candidate-location representation, wherein the second input representation is generated by the first input processor based further on the location signals.

24. A computing device, comprising:
a plurality of input processors configured to:
receive input data associated with features at different locations of an object;
generate a plurality of input representations, each input representation indicating a combination of a feature and potential locations of the feature on candidates of the object;

a location processor configured to:
determine a plurality of first candidate-location representations, each first candidate-location representation indicating the candidates and the potential locations on the candidates associated with each of the input representations, wherein each of the first candidate-location representations is an activation state of a corresponding first subset of location cells in the location processor;
generate a plurality of second candidate-location representations selected from the first candidate-location representations that are consistent with relative relationships between the different locations of the object, wherein each of the second candidate-location representations is an activation state of a corresponding second subset of the location cells in the location processor; and
determine the object based at least on the plurality of second candidate-location representations.

* * * * *